United States Patent
Yuan et al.

(10) Patent No.: US 11,128,822 B2
(45) Date of Patent: Sep. 21, 2021

(54) REAL-TIME ADAPTIVE SHADOW AND HIGHLIGHT ENHANCEMENT

(71) Applicant: Microsoft Technology Licensing, LLC, Redmond, WA (US)

(72) Inventors: Lu Yuan, Beijing (CN); Sing Bing Kang, Redmond, WA (US); Chintan A. Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 450 days.

(21) Appl. No.: 16/316,160

(22) PCT Filed: Jul. 26, 2016

(86) PCT No.: PCT/CN2016/091689
§ 371 (c)(1),
(2) Date: Jan. 8, 2019

(87) PCT Pub. No.: WO2018/018405
PCT Pub. Date: Feb. 1, 2018

(65) Prior Publication Data
US 2021/0250531 A1      Aug. 12, 2021

(51) Int. Cl.
*H04N 5/335* (2011.01)
*H04N 5/357* (2011.01)
(Continued)

(52) U.S. Cl.
CPC ......... *H04N 5/35581* (2013.01); *H04N 5/357* (2013.01); *H04N 9/0451* (2018.08); *H04N 9/083* (2013.01)

(58) Field of Classification Search
CPC .......................... H04N 5/35581; H04N 5/357
See application file for complete search history.

(56) References Cited

U.S. PATENT DOCUMENTS 6,937,772 B2   8/2005   Gindele
7,072,511 B2   7/2006   Tan et al.
(Continued)

FOREIGN PATENT DOCUMENTS

CN   105306788 A   3/2011
CN   101986688 A   2/2016
(Continued)

OTHER PUBLICATIONS

"Search Report Issued in European Patent Application No. 16909986.8", dated Jan. 15, 2020, 10 Pages.
(Continued)

*Primary Examiner* — Christopher K Peterson
(74) *Attorney, Agent, or Firm* — Alleman Hall Creasman & Tuttle LLP

(57) ABSTRACT

An "Adaptive Exposure Corrector" performs automated real-time exposure correction of individual images or image sequences of arbitrary length. "Exposure correction" is defined herein as automated adjustments or corrections to any combination of shadows, highlights, high-frequency features, and color saturation of images. The Adaptive Exposure Corrector outputs perceptually improved images based on image ISO and camera ISO capabilities in combination with camera noise characteristics via exposure corrections by a variety of noise-aware image processing functions. An initial calibration process adapts these noise aware image processing functions to noise characteristics of particular camera models and types in combination with particular camera ISO settings. More specifically, this calibration process precomputes a Noise Aware Scaling Function (NASF) and a Color Scalar Function (CSF). The NASF and CSF are then applied to adapt various image processing functions that are subsequently applied to perform real-time (Continued)

noise-aware exposure corrections on images as those images are being captured.

20 Claims, 6 Drawing Sheets

(51) Int. Cl.
  *H04N 9/083* (2006.01)
  *H04N 9/04* (2006.01)
  *H04N 5/355* (2011.01)

(56) References Cited

U.S. PATENT DOCUMENTS

| | | | |
|---|---|---|---|
| 7,734,060 | B2 | 6/2010 | Yoo et al. |
| 7,832,928 | B2 | 11/2010 | Topfer et al. |
| 8,035,728 | B2 | 10/2011 | Subbotin et al. |
| 8,164,657 | B2 | 4/2012 | Blanquart |
| 8,830,363 | B2 | 9/2014 | Jang |
| 2005/0190272 | A1 | 9/2005 | Takahashi et al. |
| 2009/0002544 | A1 | 1/2009 | Montan |
| 2009/0245632 | A1 | 10/2009 | Ovsiannikov et al. |
| 2009/0303353 | A1 | 12/2009 | Noh |
| 2010/0073494 | A1 | 3/2010 | Hirose et al. |
| 2010/0195906 | A1 | 8/2010 | Uliyar et al. |
| 2012/0093433 | A1* | 4/2012 | Gupta .................... G06T 5/007 382/260 |
| 2012/0314971 | A1* | 12/2012 | Yuan ...................... G06T 5/008 382/274 |
| 2014/0064613 | A1 | 3/2014 | Wu et al. |
| 2015/0078661 | A1 | 3/2015 | Granados et al. |

FOREIGN PATENT DOCUMENTS

| | | |
|---|---|---|
| EP | 1109130 A2 | 6/2001 |
| WO | 2010030574 A1 | 3/2010 |

OTHER PUBLICATIONS

Buades, et al., "A Note on Multi-Image Denoising", In Proceedings of the International Workshop on Local and Non-Local Approximation in Image Processing, Aug. 19, 2009, 15 Pages.

Eilertsen, et al., "Real-Time Noise-Aware Tone Mapping", In Journal of ACM Transactions on Graphics, vol. 34, Issue 6, Nov. 2015, 15 Pages.

Granados, et al., "Optimal HDR Reconstruction with Linear Digital Cameras", In Proceedings of the IEEE Computer Society Conference on Computer Vision and Pattern Recognition, Jun. 13, 2010, pp. 215-222.

"International Search Report and Written Opinion Issued in PCT Application No. PCT/CN2016/091689", dated May 9, 2017, 11 Pages.

* cited by examiner

REAL-TIME ADAPTIVE SHADOW AND HIGHLIGHT ENHANCEMENT

CROSS REFERENCE TO RELATED APPLICATIONS

The present application is a U.S. National Phase of International Patent Application Serial No. PCT/CN2016/091689 entitled "REAL-TIME ADAPTIVE SHADOW AND HIGHLIGHT ENHANCEMENT", filed Jul. 26, 2016, the entire contents of which is hereby incorporated by reference for all purposes.

BACKGROUND

Overexposure or underexposure of images are factors that are frequently considered when determining the quality of a photograph or image. These types of exposure issues are often addressed by capturing a set of two or more bracketed images of a scene for high dynamic range imaging and then applying the resulting data to correct or adjust image exposure for one or more of the bracket images. However, for most cameras, single images are captured by default. In the case of single image capture, automated exposure correction methods include techniques such as manual user adjustments, automatic histogram stretching, S-curve based exposure adjustments, machine learning-based corrections that adjust image exposures based on the appearance of similar images in an image database, etc. However, such methods tend to amplify noise and/or produce undesirable effects such as color shifting and contrast loss in the image as a byproduct of the exposure correction processing.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, an "Adaptive Exposure Corrector" as described herein, provides various techniques for performing fully automated real-time exposure correction of individual images, burst captured images or video sequences of arbitrary length, as those frames are captured by a still or video camera. Examples of camera models or types operable with the Adaptive Exposure Corrector include, but are not limited to, standalone digital cameras, cameras integral or coupled to tablet, notebook or desktop type computers, cameras integral to mobile phone type devices, digital video cameras, etc. The term "exposure correction" as used herein is defined as automated adjustments or corrections to any combination of image shadows, image highlights, high-frequency image features, and image color saturation.

The Adaptive Exposure Corrector outputs perceptually improved images as a function of image ISO and camera ISO capabilities and camera noise characteristics by adjusting image shadows, highlights and/or color saturation in a way that balances boosting of image noise with enhancement of image detail. Typically, this automated exposure correction is performed in real-time as images are being captured by applying computational capabilities within or coupled to the camera to apply noise-aware functions to captured images. However, the Adaptive Exposure Corrector can also perform automated exposure correction as an offline procedure to post-process previously captured images and image sequences.

In various implementations, a Noise Aware Scaling Function (NASF) is pre-computed for each camera model or type from a combination of Noise Level Functions (NLF) computed for each camera and human selections of preferred images from sets of multiple exposure adjusted examples of images captured at each of a range of ISO's for each camera. Similarly, an optional precomputed Color Scalar Function (CSF) is computed for each camera model or type from a combination of camera ISO features and human selections of preferred images from sets of multiple color saturation adjusted examples of images captured at each of a range of ISO's for each camera.

The NASF and optional CSF corresponding to a particular camera model or type are then applied to adapt or modify various exposure correction functions, including but not limited to a histogram stretching function, an S-curve parameter estimation function, a detail fusion function, and a color saturation function. The noise- and ISO-based modifications or adaptations to these functions produces a set of noise-aware exposure functions that are adapted to noise characteristics of particular cameras and the ISO at which particular images are captured by those cameras. The resulting noise aware functions are then made available to computational capabilities within or coupled to each corresponding camera model or type for real-time exposure correction operations.

For example, following image capture, an automated histogram stretching of that image is achieved by applying a noise-aware histogram stretching process (based on the precomputed NASF) to that image. This noise-aware histogram stretching process then outputs a histogram stretched version of the input image based on noise characteristics of the particular camera and ISO being used to capture the image. The output of this noise-aware histogram stretching process is then provided to a zone-based tone-mapping process that estimates parameters of zone- or region-based tone mapping S-curves in view of the corresponding NASF. The resulting noise-aware S-curves are then applied to the histogram-stretched image to perform exposure adjustments. In various implementations, the NASF is also applied to modify high frequency details extracted from the original input image. These modified high-frequency details are then fused with the image resulting from the noise-aware S-curve based exposure adjustments.

The resulting image may then be provided as an initial output image. However, in various implementations, color saturation of the initial output image is further adjusted by applying a noise-aware Color Saturation Compensation Function (CSCF) that has been adapted to the noise and ISO characteristics of the capturing camera via the CSF. The resulting image is then provided as a final output image. Advantageously, all of these operations, from the point where the image frame is initially captured to the point where the final output image is produced, occur in real-time without requiring user intervention or interaction with the Adaptive Exposure Corrector.

The Adaptive Exposure Corrector described herein provides various techniques for performing fully automated real-time exposure correction of individual images as they are captured by a still or video camera. In addition to the benefits described above, other advantages of the Adaptive Exposure Corrector will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
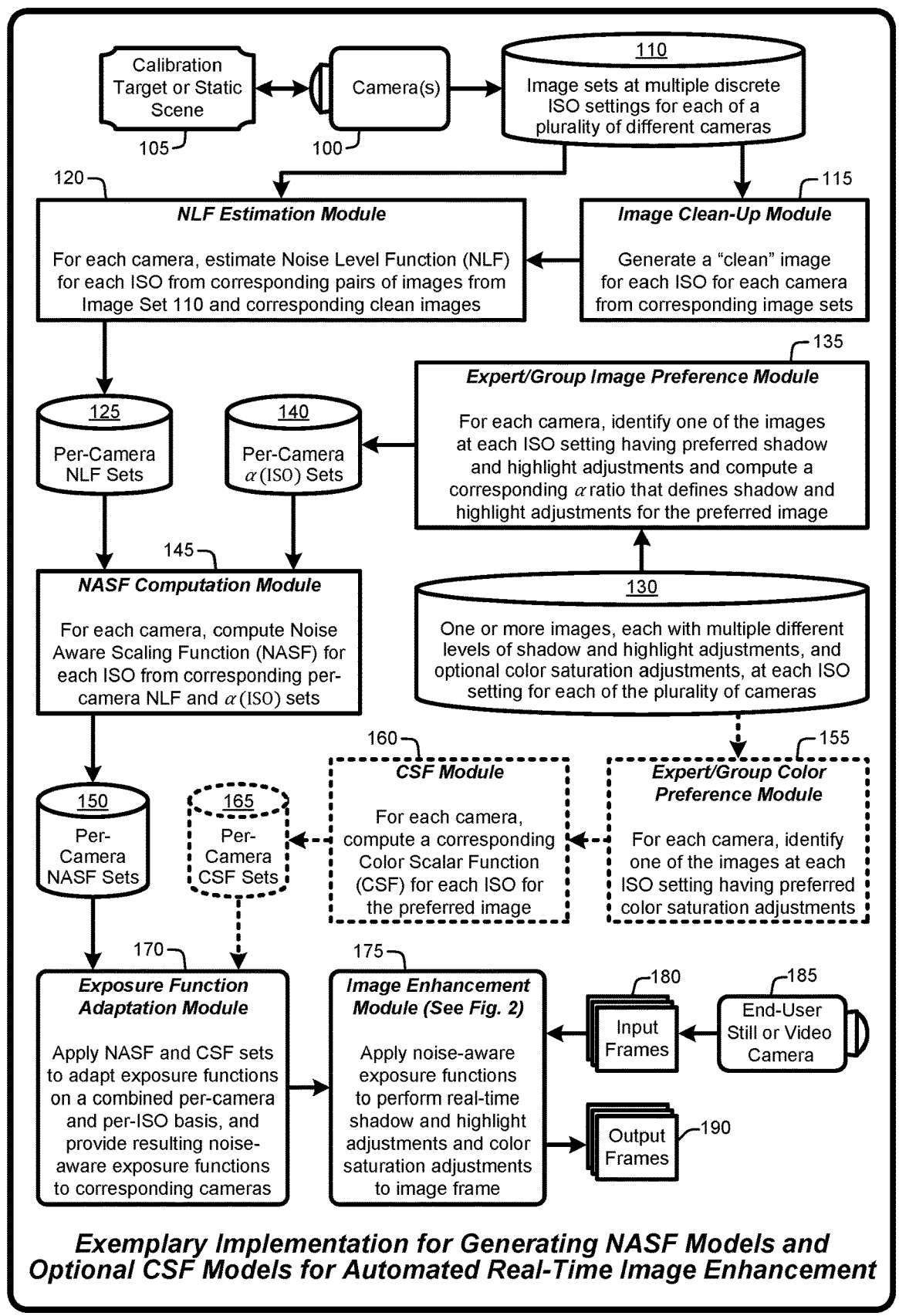
FIG. 1 provides an exemplary architectural flow diagram that illustrates program modules for effecting various implementations of an "Adaptive Exposure Corrector," as described herein.

In the following description of various implementations of an "Adaptive Exposure Corrector", reference is made to the accompanying drawings, which form a part hereof, and in which is shown by way of illustration specific implementations in which the Adaptive Exposure Corrector may be practiced. Other implementations may be utilized and structural changes may be made without departing from the scope thereof.

Specific terminology will be resorted to in describing the various implementations described herein, and that it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Adaptive Exposure Corrector. Further, the appearance of such phrases throughout the specification are not necessarily all referring to the same implementation, and separate or alternative implementations are not mutually exclusive of other implementations. The order described or illustrated herein for any process flows representing one or more implementations of the Adaptive Exposure Corrector does not inherently indicate any requirement for the processes to be implemented in the order described or illustrated, and any such order described or illustrated herein for any process flows do not imply any limitations of the Adaptive Exposure Corrector.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

In general, an "Adaptive Exposure Corrector" provides various techniques for performing fully automated real-time exposure correction of individual input images as they are captured by a still or video camera. These input images may be black and white images, color images, sepia toned images, images with additional types of toning applied, images within any desired color space, and images having any desired bit depth. Examples of camera models or types operable with the Adaptive Exposure Corrector include, but are not limited to, standalone digital cameras, cameras integral or coupled to tablet, notebook or desktop type computers, cameras integral to mobile phone type devices, digital video cameras, etc.

More specifically, the Adaptive Exposure Corrector performs automated real-time exposure correction of individual images and image or video sequences of arbitrary length. The term "exposure correction" is defined herein as automated adjustments or corrections to any combination of shadows, highlights, high-frequency features, and color saturation of images. The Adaptive Exposure Corrector outputs perceptually improved images based on image ISO and camera ISO capabilities and noise characteristics by performing image exposure corrections via a combination of noise-aware exposure functions in a way that balances boosting of image noise with enhancement of image detail. This exposure correction adapts or otherwise adjusts each image frame by applying exposure functions that have been adapted or modified based on a precomputed Noise Aware Scaling Function (NASF) and/or a Color Scalar Function (CSF). Generally, this automated exposure correction is performed in real-time (e.g., typically less than one second) as images are being captured by applying computational capabilities within or coupled to the camera. Further, the Adaptive Exposure Corrector can also operate as an offline implementation to post-process previously captured images at any time after capture.

Figure 2:
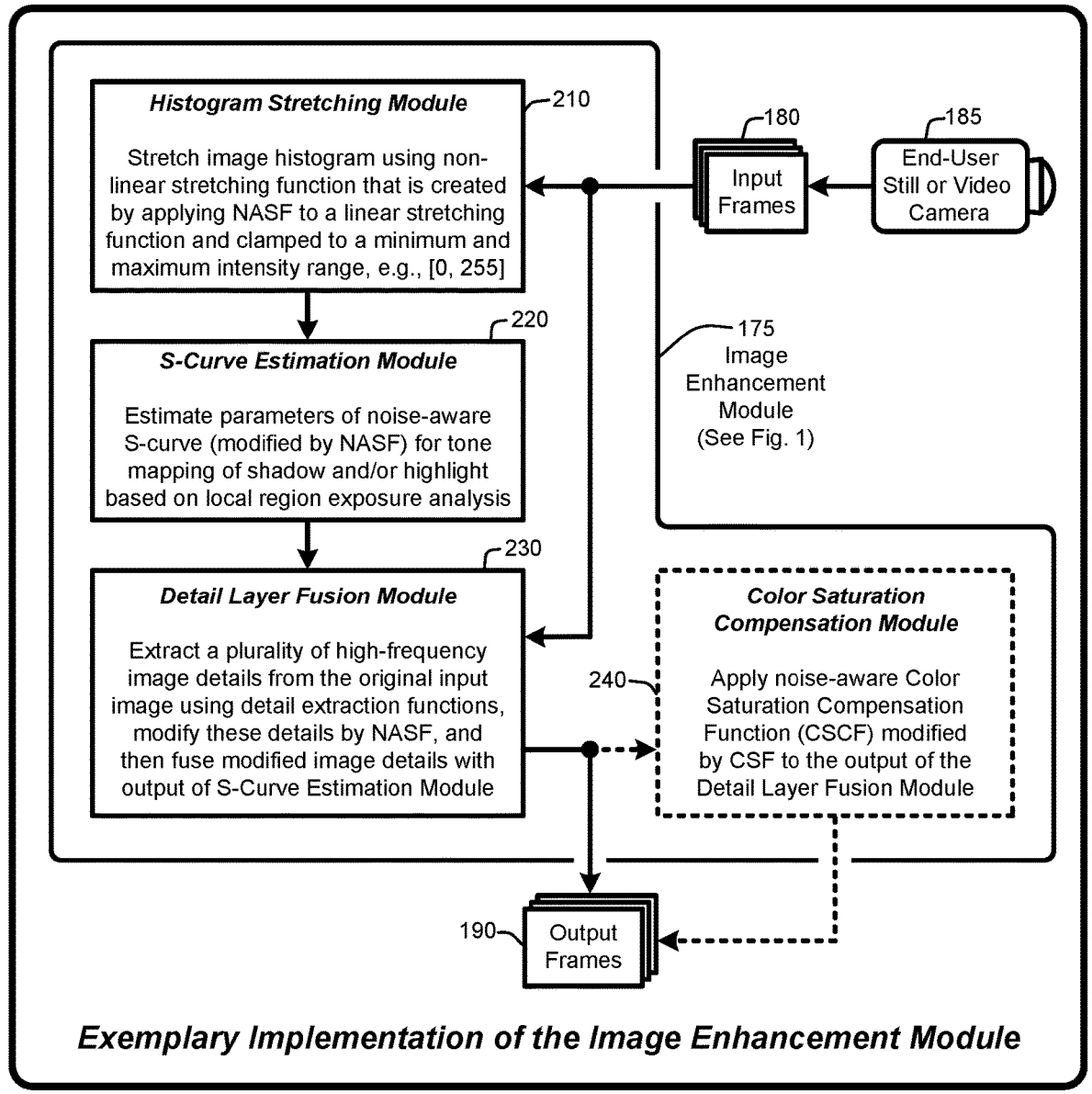
FIG. 2 provides an exemplary architectural flow diagram that illustrates program modules for effecting various implementations of the Adaptive Exposure Corrector, as described herein.

1.1 System Overview:

As mentioned above, the Adaptive Exposure Corrector provides various techniques for performing fully automated real-time exposure correction of individual images as they are captured by a still or video camera. The processes summarized above are illustrated by the general system diagram of FIG. 1 and FIG. 2. In particular, the system diagrams of FIG. 1 and FIG. 2 illustrate the interrelationships between program modules for implementing various implementations of the Adaptive Exposure Corrector, as described herein. Furthermore, while the system diagrams of FIG. 1 and FIG. 2 illustrate high-level views of various implementations of the Adaptive Exposure Corrector, FIG. 1 and FIG. 2 are not intended to provide exhaustive or complete illustrations of every possible implementation of the Adaptive Exposure Corrector as described throughout this document.

In addition, any boxes and interconnections between boxes that may be represented by broken or dashed lines in FIG. 1 or FIG. 2 represent alternate implementations of the Adaptive Exposure Corrector described herein, and any or all of these alternate implementations, as described below, may be used in combination with other alternate implementations that are described throughout this document.

For example, as illustrated by FIG. 1, in various implementations the Adaptive Exposure Corrector begins the process of computing the aforementioned NASF by using a plurality of different camera 100 models and/or types to capture a large number of images of a calibration target or static scene 105 under a variety of lighting conditions. More specifically, each particular camera 100 model or type captures a large number of images of the calibration target or static scene 105 at each of a plurality of ISO settings of the particular camera. The result is a separate image set 110 for each camera 100 that each includes, for each ISO, a large number of images of the calibration target or static scene 105. Different NASF and CSF sets are then computed for each different model or type of camera 100, and each ISO, based on the images captured by those cameras. Therefore, for purposes of clarity, the following discussion will generally refer to computation of these sets for a single camera.

Based on characteristics that include, but are not limited to, camera ISO settings, lighting conditions, optical or digital zoom, etc., each of the images captured by camera 100 for populating image set 110 will include some amount of noise. The resulting noisy image set 110 captured by the camera 100 from the calibration target or static scene 105 is then provided to an Image Clean-Up Module 115. The Image Clean-Up Module 115 generates or otherwise estimates a single "clean" image (e.g., less noise) for each ISO at which the calibration target or static scene 105 was imaged by the camera 100. In various embodiments, the clean image is produced for each of the camera 100 ISO settings by averaging the images of the calibration target or static scene 105 captured at each particular ISO setting. For example, assuming that 25 images were captured by camera 100 at an ISO setting of 800, all 25 of those images can be aligned and averaged by the Image Clean-Up Module 115 to produce the clean image. Other techniques that may be adapted by the Image Clean-Up module 115 for generating this clean image include, but are not limited to, median blending based techniques, multi-image super-resolution processing techniques, various filtering techniques, etc.

Given the single clean image for each of the camera ISO settings and the corresponding set 110 of multiple noisy versions of that same image at each ISO, a Noise Level Function (NLF) is estimated by an NLF Estimation Module 120. In other words, in various implementations, the NLF Estimation Module 120 estimates a separate NLF for each ISO of the camera 100 from multiple corresponding pairs of images from the image set 110 and the corresponding clean image. For example, assuming that 25 images were captured by the camera 100 at an ISO setting of 800, all 25 of those images can be separately paired with the corresponding clean image to provide 25 separate data points that may be jointly processed to estimate the NLF for ISO 800 for that camera. Processing of each of the sets of images for each ISO of the camera 100 in a similar manner produces per-camera NLF sets 125 that cover all of the ISO settings at which the calibration target or static scene 105 was captured by the camera. Further, for ISO settings of the camera 100 other than those used to capture the calibration target or static scene 105, the computed per-camera NLF sets 125 can be interpolated or extrapolated to generate additional NLF sets for those additional ISO settings.

In a separate related process, per-camera $\alpha(ISO)$ sets 140 (also referred to herein as "alpha functions") are generated for each of a plurality of ISO settings for each camera 100. In general, for each of the plurality of ISO settings for the camera 100, an Expert/Group Image Preference Module 135 is used to receive input from human viewers, including individual imaging experts, groups of imaging experts, individual users, and/or groups of users, as to a preferred instance of a particular image at that ISO setting from multiple instances of that image in an image set 130.

In other words, a particular image is captured at a particular ISO by a particular camera. That image is then processed using any desired image processing techniques to provide a large number of different exposure adjustments and optional color saturation adjustments. The resulting sets of images 130 for each of the plurality of ISO settings for each camera 100 are then presented to the human viewers via the Expert/Group Image Preference Module 135 or other presentation mechanism or crowd-sourcing process. For each of the plurality of ISO settings of the camera 100, these human viewers then make a selection of a single preferred image. So, assuming the use of, e.g., 10 distinct ISO settings, 10 corresponding selections of single preferred images will be made for the camera 100 via the Expert/Group Image Preference Module 135. The aforementioned per-camera $\alpha(ISO)$ sets 140 are then computed for the corresponding camera 100 based on the exposure adjustments made to the preferred images selected by the human viewers.

For each of the different models or types of camera 100, both the corresponding per-camera NLF sets 125 and the corresponding per-camera $\alpha(ISO)$ sets 140 are then provided to an NASF Computation Module 145. In general, for each of the different models or types of camera 100, the NASF Computation Module 145 computes the per-camera NASF sets 150 for each ISO from a combination of the corresponding per-camera NLF and $\alpha(ISO)$ sets.

Similarly, in various implementations, an optional Expert/Group Color Preference Module 155 is used to identify images from image set 130 (or any other image set) that have preferred color saturation adjustments for each ISO setting of the camera 100. So, assuming the use of, e.g., 10 distinct ISO settings, 10 selections of images having preferred color saturation adjustments will be made for the camera 100 via the Expert/Group Color Preference Module 155. The resulting selections are then provided to a CSF Module 160. In general, for each of the plurality of ISO settings for the camera 100, the CSF Module 160 computes a corresponding Color Scalar Function (CSF) for the camera 100 based on the color saturation adjustments made to the preferred images selected by the human viewers.

The resulting per-camera NASF sets 150 and optional per-camera CSF sets 165 are then provided to an Exposure Function Adaptation Module 170. In various implementations, the Exposure Function Adaptation Module 170 applies the per-camera NASF sets 150 and optional per-camera CSF sets 165 to adapt or modify various exposure correction functions, including but not limited to a histogram stretching function, an S-curve parameter estimation function, a detail fusion function, and a color saturation function. The noise- and ISO-based modifications or adaptations to these functions produces a set of noise-aware exposure functions that are adapted to noise characteristics of particular cameras and the ISO at which particular images are captured by those cameras.

The resulting noise aware exposure functions are then made available to an Image Enhancement Module 175 for use in real-time exposure correction operations. In various implementations, the Image Enhancement Module 175 is instantiated within computational capabilities integral or coupled to each corresponding camera model or type for real-time exposure correction operations.

More specifically, the Image Enhancement Module 175 applies exposure correction settings (and optional color saturation adjustment settings) based on the particular NASF and/or CSF for any particular ISO at which any new image frame 180 (or image sequence) is captured by an end-user still or video camera 185. The Image Enhancement Module 175 then generates an improved output frame 190 in real-time (e.g., typically less than 1 second of processing time from input frame 180 capture to adjusted frame output for a typical phone-based camera). Exemplary functionality of the Image Enhancement Module 175 is further described in the following paragraphs with respect to FIG. 2.

For example, as illustrated by FIG. 2, in various implementations the Image Enhancement Module 175 of Adaptive Exposure Corrector operates in real-time to receive the input image 180 from the end-user still or video camera 185. A Histogram Stretching Module 210 of the Image Enhancement Module 175 then stretches an image histogram extracted from the input image by applying a noise-aware non-linear stretching function to the image histogram. In general, this non-linear stretching function is generated by applying the NASF to modify a linear stretching function and then clamping the resulting modified stretching function to a minimum and maximum intensity range corresponding to an image bit depth, e.g., [0, 255].

In addition, in various implementations, an S-Curve Estimation Module 220 estimates parameters of a noise-aware S-curve (modified by the corresponding NASF) for tone mapping of shadow and/or highlight based on local region exposure analysis. Further, in various implementations, a Detail Layer Fusion Module 230 extracts a plurality of high-frequency image details from the original input image frame 180 using various detail extraction functions. These extracted details are then modified or adjusted based on the corresponding NASF. The Detail Layer Fusion Module 230 then fuses the modified image details with output of the S-Curve Estimation Module 220.

At this point, the Image Enhancement Module 175 can produce the output frame 190. However, in various implementations, a Color Saturation Compensation Module 240 component of the Image Enhancement Module 175 first applies a noise-aware Color Saturation Compensation Function (CSCF), which has been modified or adapted based on the corresponding CSF, to the output of the Detail Layer Fusion Module 230 to produce the final output frame 190 by adjusting the color saturation of that image.

In addition, in various implementations, any or all of the Histogram Stretching Module 210, the S-Curve Estimation Module 220, the Detail Layer Fusion Module 230, and the Color Saturation Compensation Module 240, may be applied to the input frame 180 individually, or in any desired combination or order of the outputs of any of these modules to achieve a variety of automated exposure correction results. Further, any or all of the Histogram Stretching Module 210, the S-Curve Estimation Module 220, the Detail Layer Fusion Module 230, and the Color Saturation Compensation Module 240, may be combined with any other existing image processing techniques to improve perceptual quality of resulting output images.

2.0 Operational Details of the Adaptive Exposure Corrector:

The above-described program modules and/or devices are employed for instantiating various implementations of the Adaptive Exposure Corrector. As summarized above, the Adaptive Exposure Corrector provides various techniques for performing fully automated real-time exposure correction of individual images as they are captured by a still or video camera as a function of image ISO, camera ISO capabilities, and camera noise characteristics. The following sections provide a detailed discussion of the operation of various implementations of the Adaptive Exposure Corrector, and of exemplary methods and techniques for implementing the features and program modules described in Section 1 with respect to FIG. 1 and FIG. 2. In particular, the following sections provides examples and operational details of various implementations of the Adaptive Exposure Corrector, including:

An operational overview of the Adaptive Exposure Corrector;
Overview of exposure correction without considering noise;
Noise-Aware adaptive exposure correction;
Determining Noise-Level Functions (NLF);
Determining Noise-Aware Scaling Functions (NASF);
NASF for real-time shadow and highlight enhancement;
Optional noise-aware color saturation compensation; and
Optional data-driven parameter estimation.

2.1 Operational Overview:

As mentioned above, the Adaptive Exposure Corrector provides various techniques for performing fully automated real-time exposure correction of individual images as they are captured by a still or video camera. More specifically, the Adaptive Exposure Corrector outputs perceptually improved images based on image ISO and camera ISO capabilities in combination with camera noise characteristics via exposure corrections performed in real-time by a variety of noise-aware image processing functions.

2.2 Overview of Exposure Correction without Considering Noise:

In general, exposure correction can be performed without consideration of the aforementioned Noise Aware Scaling Function (NASF) or optional Color Scalar Function (CSF). However, exposure correction is further improved relative to the perception of human users by applying the NASF and optional CSF described in Section 2.3 and the subsequent sections of this document to modify the exposure correction techniques described Section 2.2 of this document.

More specifically, the paragraphs of Section 2.2 of this document, including sub-Section 2.2.1 and 2.2.2, describe various examples of techniques for performing exposure correction without consideration of image noise and potential adverse boosting of image noise during exposure correction processing of images. Section 2.3 and the subsequent sections of this document describe noise-aware adaptations to the exposure correction techniques of Section 2.2 in a way that further improves perceived image quality by balancing boosting of image noise with enhancement of image detail when performing real-time image corrections.

For example, in various implementations, image exposure correction is achieved by determining luminance modification parameters and applying those parameters to a non-linear function that characterizes luminance of the image in shadow, mid-tone, and highlight regions of the image to improve the appearance of the input image. Specifically, the exposure correction improves the appearance of the input image by modifying overexposed and/or underexposed regions or zones of the input image such that features of the input image that are not visible or difficult to discern in the overexposed and/or underexposed regions of the input image become more apparent. For example, overexposed regions may appear darker, while underexposed regions may appear lighter. Advantageously, such exposure corrections do not detrimentally affect the appearance of regions of the input image that are not overexposed or underexposed.

In various implementations, this exposure correction process begins by performing an auto-level stretch operation, also referred to herein as an automated histogram stretching operation. In general, this auto-level stretch operation modifies luminance values of the input image by modifying a histogram associated with the input image. This histogram is used to bin intensity of luminance values of the input image. For example, in a typical 256-level image, luminance values of images may be measured on a scale from 0 to 255, where a luminance value of 0 corresponds to pure black and a luminance value of 255 corresponds to pure white. Clearly, other luminance ranges may be considered by the Adaptive Exposure Corrector for this purpose. For example, 8-bit grayscale provides $2^8$ or 256 levels of luminance per pixel while 16-bit grayscale provides $2^{16}$ or 65,536 levels of luminance.

However, when the maximum and/or minimum luminance values for a particular input image do not reach to the maximum and/or minimum ends of the range (e.g., 0 for the minimum value and 255 for the maximum value for 8-bit luminance), the auto-level stretch operation linearly stretches the histogram such that the minimum and maximum luminance values on the histogram (and thus the luminance of the input image) correspond to the full luminance range being considered (e.g., 0 and 255). As a result, global contrast of the input image may be increased, which helps achieve improved details discrimination. On the other hand, either relatively dark pixels or relatively bright pixels in different images would be uniformed to similar intensity level for the later region-based exposure analysis.

To further improve the appearance of overexposed and/or underexposed regions of the input image, exposure evaluation of the histogram-stretched image is performed. In general, this exposure evaluation determines luminance modification parameters that are subsequently applied to adjust the luminance of shadow and highlight regions or zones of the image. Assuming an 8-bit luminance range, shadow regions or zones of the input image tend to have luminance values that are relatively nearer to 0. Conversely, highlight portions of the input image tend to have luminance values relatively nearer to 255. Mid-tone regions or zones of the input image tend to have luminance values between the highlight and shadow regions or zones of the image. For example, in a black and white photograph, the mid-tone would be gray.

In an illustrative implementation, the luminance modification parameters are determined by segmenting the input image into a number of regions or zones. In particular, adjacent pixels of the input image having the same or similar luminance values may be grouped together. In some instances, these groups may be referred to as "superpixels." After forming the superpixels of the input image, the exposure evaluation operation may include determining a zone of each superpixel and grouping superpixels associated with the same zone. The zone of each superpixel may refer to a range of luminance values on a scale of luminance values. For example, in various implementations, a luminance value range of 0 to 255 (e.g., 8-bit space) is divided into 11 zones, though more or fewer zones may be used. Each of the zones may be associated with a mean luminance value. Furthermore, the exposure evaluation operation may include identifying regions of the input image associated with the sky and/or associated with faces. Superpixels associated with sky regions or facial regions may be grouped together and assigned to a respective zone.

After identifying an initial group of zones for each region of the input image, the exposure evaluation operation determines optimal zones for each region of the input image. In general, the optimal zones for each region of the input image correspond to the zone that provides an improved appearance for the features of the respective region. More specifically, the optimal zone for a region maximizes the appearance of features of the region, preserves the relative contrast between the region and neighboring regions, and avoids a reversal of contrast in the region.

After determining the optimal zone for each region, the exposure evaluation operation calculates either or both a shadow luminance modification parameter and a highlight luminance modification parameter. The highlight luminance modification parameter and/or the shadow luminance modification parameter may then be utilized in a shadow/highlight correction operation to improve the appearance of features of the input image. In various implementations, the shadow/highlight correction operation generates a non-linear function, on a per-zone basis, that indicates changes to the luminance values of the input image. For example, these non-linear functions may include S-shaped curves that represent output image luminance values (either increased or decreased depending on the shape of the curve) in relation to input image luminance values. Modification of the luminance values of the input image according to the S-shaped curve produces an intermediate image. This intermediate image can be output as an improved image.

However, in various implementations, the resulting intermediate image is subjected to additional processing to further improve image appearance. For example, after modifying the luminance values of the input image based on the selected S-shaped curves, the resulting intermediate image may be further processed by adding in, or fusing, high-frequency details from the original input image that may not be apparent in the intermediate image. Additionally, any artifacts of the intermediate image, such as a halo associated with certain portions of the intermediate image and/or over-amplified dark/bright tones may be reduced before the modified image is generated.

2.2.1 Exposure Correction Details, without Consideration of Noise:

The aforementioned process for determining optimal zones for each region of the input image can be applied to maximize visible details of the input image via techniques, such as, for example, generating one or more gamma-corrected image versions of the input image. In various implementations, these gamma-corrected images may be generated by applying an exponential function on the order of a gamma factor to the input image in order to modify luminance values of the input image. In various implementations, generating images with gamma factors of 0.5 and 2.0, with a factor of 1.0 corresponding to no gamma correction, produced useful results for determining optimal zones. However, gamma factors at any desired level may be applied for this purpose. In general, where the gamma-corrected image includes features that appear brighter than the input image, this indicates the use of a gamma factor of less than 1. Conversely, where the gamma-corrected image includes features that appear darker than the input image, this indicates the use of a gamma factor of greater than 1.

After generating the gamma-corrected images, the process for determining optimal zones applies various edge detection techniques to detect edges within the input image and one or more of the gamma-corrected images generated from the input image. The edge detection is performed to identify points of the input image and the gamma-corrected images where the luminance changes or has discontinuities. These detected edges are then applied to produce edge maps showing the edges within the input image and the edges within one or more of the gamma-corrected images.

The resulting edge maps are then used to measure the visible details of the respective images. For example, the edges of the input image, the edges of a gamma-corrected image with a gamma factor less than 1, and the edges of a gamma-corrected image with a gamma factor greater than 1, may be represented by respective edge sets $\Omega_1$, $\Omega_s$, and $\Omega_l$. The visible details of the shadow regions of the input image and the highlight regions of the input image can be calculated using the edge differences between the input image, the gamma-corrected image with a gamma factor less than 1, and the gamma-corrected image with a gamma factor greater than 1. For example, the edge differences in the shadow region may be represented by $\Omega_{diff}^S = \Omega_s - (\Omega_s \cap \Omega_l)$ and the edge differences in the highlight region may be represented by $\Omega_{diff}^H = \Omega_l - (\Omega_s \cap \Omega_l)$. The relative visibility of details in the shadow region $V^s$ and highlight region $V^h$ of the input image can be calculated according to Equation (1):

$$V^s = \frac{\text{card}\Omega_{diff}^S}{\text{card}\Omega_{all}}, V^h = \frac{\text{card}\Omega_{diff}^H}{\text{card}\Omega_{all}} \quad \text{Equation (1)}$$

where card(*) indicates the number of pixels associated with the detected edges in a set and $\Omega_{all} = \Omega_1 \cup \Omega_s \cup \Omega_l$.

Further, the relative contrast between neighboring regions may be calculated based on differences between luminance values of the neighboring regions. In various implementations, the process for determining optimal zones generates histograms showing luminance values with respect to intensity for a first region of the input image that is adjacent to a second region. This process for determining optimal zones then determines a distance between the mean luminance value of the first region and the mean luminance value of the second region.

For example, assume the use of 11 zones as mentioned above (each assigned corresponding roman numerals for purpose of discussion). Further, assume that the first region is assigned to zone II and has a mean luminance value of, e.g., 51, while the second region is assigned to zone VII and has a mean luminance value of, e.g., 179. In this example, the difference between the mean luminance values of the first region and the second region is 128. The process for determining optimal zones can calculate the relative contrast between the first region and the second region by shifting the respective histograms of the first region and the second region a minimum distance that maximizes the intersection of the luminance values of the first region and the second region.

For example, the process for determining optimal zones may shift the histogram of the first region and the histogram of the second region, such that some of the higher luminance values of the first region intersect with some of the lower luminance values of the second region. In shifting the histograms of the first region and the second region, the first region and the second region may be associated with different zones. In one example, the first region may be assigned to, e.g., zone III after the shift and the second region may be assigned to, e.g., zone VI after the shift. Thus, in this example, the mean luminance values may have changed to, e.g., 77 for the first region and, e.g., 153 for the second region with a distance between them of 76.

After measuring the visible details of the input image and measuring the relative contrast of the input image, the process for determining optimal zones may determine optimal zones for each region of the input image that may be different from the zones initially assigned to each region. In various implementations, this process for determining optimal zones determines the optimal zones for the regions of the input image by minimizing a Markov Random Fields (MRF) energy function with respect to the measurement of the visible details and the measurement of the relative contrast of the input image. An exemplary MRF energy function E(Z) is given by Equation (2):

$$Z^* = \underset{Z}{\operatorname{argmin}} E(Z) = \underset{Z}{\operatorname{argmin}} \left( \sum_i E_i + \lambda \sum_{i,j} E_{i,j} \right) \quad \text{Equation (2)}$$

where the optimal labels $Z=\{z_i\}$ with $z_i$ being the desired zone for a particular region. In addition, $E_i$ is a data term for an individual region i, $E_{i,j}$ is the pairwise term between two adjacent regions i and j, and is a weighting factor. The weighting factor $\lambda$ can be estimated by summing the data terms $E_i$ and the pairwise terms $E_{i,j}$ across each combination of zone candidates and setting equal to the sum of the ratio of data terms $E_i$ and the pairwise terms $E_{i,j}$. $E_i$ and $E_{i,j}$ can be given in the probability form $E_i = -\log(P(i))$ and $E_{i,j} = -\log(P(i,j))$. The likelihood P(i) of a region is measured by the visibility of details V, the region size C (normalized by the overall size of the image), and the semantic importance $\theta_i$ (measured by the percentage of semantic area) and is given by Equation (3):

$$P(i)=V_i \cdot C_i \cdot \theta_i \cdot \rho(|z_i - \hat{z}_i|) \quad \text{Equation (3)}$$

where $\rho(*)$ is a sigmoid function $\rho(t)=1/(1+\exp(t))$ and $|z_i - \hat{z}_i|$ is the deviation from the initial zone $\hat{z}_i$. $V^s$ and $V^h$ can be used to calculate $P_i$ in the shadow zone regions and highlight zone regions, respectively.

The coherence P(i,j) is defined by the change of relative contrast between two regions from the initial relative contrast, that is the initial distance between the mean luminance values of the histograms of the regions, $\hat{d}_{i,j}$ to a new relative contrast $d_{i,j}$. The coherence P(i,j) is denoted by Equation (4):

$$P(i,j)=C_j \cdot g(d_{ii}-d_{i,j}) \quad \text{Equation (4)}$$

where $g(*)$ is a zero-mean Gaussian function with a specified variance (e.g., 0.15). The Gaussian function $g$ minimizes any dramatic change of the relative contrast. Further, the weight $C_j$ is used such that relatively smaller regions contribute less to the coherence P(i,j).

In some cases, the process for determining optimal zones applies one or more constraints when minimizing the MRF energy function E(Z) to determine the optimal zones for the regions of the input image. For example, the one or more constraints may include restricting changes in the zone of a region across zone V, regions associated with zone V remain unchanged, the zone change for regions assigned to the same initial zone should be the same for each region (e.g., each region assigned to zone II is modified to zone III), or combinations thereof. Additionally, in some instances, to obtain a global optimization of the MRF energy function E(Z), an iterative brute force searching method may be used to consider every combination of zone candidates for each region.

As mentioned above, in various implementations, the exposure correction process also performs a parameter calculation process to calculate luminance modification parameters (e.g., the aforementioned S-curves) that can be used to modify the luminance of certain portions of the input image in order to improve the appearance of the input image. In particular, the luminance modification parameters may be used to improve the appearance of overexposed and/or underexposed regions of the input image.

In various implementations, the luminance modification parameters may be calculated such that the zone associated with each region of the input image is moved as much as possible toward its respective optimal zone as calculated by the process for determining optimal zones. To calculate the shadow and highlight luminance modification parameters, $\phi_s$ and $\phi_h$, the original exposure of each region is calculated by the intensity mean $e_i = \Sigma I_n / c_i$ where $I_n$ is the original intensity and $c_i$ is the region size.

Therefore, the shadow luminance modification parameter $\phi_s$ can be calculated according to $\phi_s = (\mu_i - e_i) \cdot c_i / \Sigma f\Delta(I_n)$ where $\mu_i$ is the target exposure corresponding to its respective zone value. Additionally, $f\Delta(I_n)$ is the luminance change after shadow or highlight luminance modification. The mathematical form of $f\Delta(I_n)$ is shown below in Equation (5). In addition, the highlight luminance modification parameter may be calculated according to $\phi_h = (e_i - u_i) \cdot c_i / f\Delta(1 - I_n)$.

In various implementations, once the shadow and/or highlight luminance modification parameters are calculated for each region, the weighted average is taken with respect to the shadow and/or luminance modification parameters for each region with the relative region size $c_i$ serving as the weight. An overall shadow luminance modification parameter of the input image may be calculated from the weighted average of the region shadow luminance modification parameters and an overall highlight luminance modification parameter of the input image may be calculated from the weighted average of the region highlight luminance modification parameters.

The shadow and highlight luminance modification parameters of the input image calculated as discussed above may be utilized to generate a non-linear function (e.g., the aforementioned S-curves) that maps the initial luminance values for pixels of the input image with modified luminance values for the pixels. The non-linear function may be characterized as an S-shaped curve or an inverted S-shaped curve and may be given by Equation (5):

$$f(x) = x + \phi_s \cdot f\Delta(x) - \phi_h \cdot f\Delta(1-x) \quad \text{Equation (5)}$$

where x and f(x) are the normalized input pixel luminance and the modified pixel luminance, respectively. Additionally, $f\Delta(x)$ is an increment function defined by $f\Delta(x) = \kappa_1 x \exp(-\kappa_2 x^{\kappa_3})$ where $\kappa_1$ controls the modified maximum luminance change amplification of the shadows or highlights, and $\kappa_2$ and $\kappa_3$ control the modified tone range of the shadows or highlights. In an illustrative example, $x_1=5$, $\kappa_2=14$, and $\kappa_3=1.6$. The shadow and highlight luminance modification parameters can be applied to the non-linear function, such as the S-curve function of Equation (5), to produce an output image based on the input image.

In some instances, additional features can be added to the output image to produce a modified output image. In a particular implementation, after generating the output image utilizing the non-linear function (e.g., the aforementioned S-curve), the output image can be fused with a local details image to produce the modified output image. For example, the input image may be designated as I, the image generated by applying the shadow and highlight parameters to the non-linear function may be designated as $f(I)$, and a filtered version of the input image that is produced by applying one or more low-pass filters (e.g., a Gaussian filter) may be referred to as $I_F$. A local details image, $\Delta I$, that can be used to add features to the intermediate image may be produced by taking the difference between the input image and the filtered version of the input image. Thus, $\Delta I = I - I_F$, and in an illustrative example, the modified output image Î may be produced via equation (6):

$$\hat{I} = f(I) + [2 \cdot f(I)(1 - f(I))] \cdot \Delta I \quad \text{Equation (6)}$$

where the term $[2 \cdot f(I)(1 - f(I))]$ may serve to add features to certain portions of the intermediate output image. In particular cases, the number of features added to the mid-tone range is greater than the number of features added in the shadow range or highlight range. Thus, in equation (6), the term $f(I)(1 - f(I))$ reaches a maximum in the mid-tone range.

When the input image is a black and white image, the operations performed during exposure correction processing are performed with respect to the luminance channel of the input image. When the input image is a color image, the operations performed during exposure correction processing are performed with respect to the luminance channel of the input image and the color channel of the input image. For example, the above-described luminance adjustments via the non-linear function (e.g., S-curves) may separate the luminance channel of the input image from the color channel. A ratio between luminance values of pixels of the input image and luminance values of pixels of the modified version of the input image can also be computed. This ratio can then be applied on the color channel. Thus, the pixels of the input image on the color channel may be modified according to this ratio to produce the modified version of the input image.

In some scenarios, an output image may have some artifacts, such as a halo effect associated with some portions of the output image and/or the over-amplification or boosting of some of the darkest and/or brightest tones of the output image. In these scenarios, artifacts can be reduced by applying a filter to the output image to reduce portions of the output image associated with the halo effect or other artifacts. In some cases, the filter applied to the output image is applied instead of the Gaussian filter that may be used to produce the filtered version of the input image as described above.

For example, in various implementations, the filter applied to the output image includes a guided filter that is a linear transform of a guidance image, where the guidance image may be the input image or another image. To minimize or eliminate over-amplification or boosting artifacts, the output image can be blended with the input image using a near-black confidence map when correcting over-amplification of dark tones and using a near-white confidence map when correcting over-amplification of bright tones. Assuming an RGB color space, the confidence value for the near-black confidence map may be measured by the distance between the minimum of Red-Green-Blue (RGB) colors in each pixel and pure black and the confidence value for the near-white confidence map may be measured by the distance between the maximum of RGB colors in each pixel and pure white. The distance may be measured using a Gaussian function with an intensity value such as 0.05 considered as pure black and an intensity value such as 0.95 considered as pure white when the image intensity values are normalized to [0,1].

2.2.2 Exposure Correction Examples, without Consideration of Noise:

As discussed above, the techniques described in Section 2.2 and 2.2.1 of this document can be applied to produce a modified version of an input image with corrected exposure by calculating luminance modification parameters that are applied to a non-linear function, such as an S-curve, that characterizes the luminance of shadow, mid-tone, and highlight regions of the input image without consideration of camera noise characteristics.

In various limitations, this exposure correction process includes determining a zone for each region of a plurality of regions of the image. The zone of each respective region indicates a specified range of luminance values associated with the respective region on a scale of luminance values. For example, assuming an 8-bit luminance space, the scale of luminance values from 0 to 255 is divided into some number of zones, e.g., 11 zones or any other desired number of zones. In various implementations, the pixels of the image are grouped according to their respective luminance values. Groups of pixels having luminance values that fall within a particular range of luminance values may be grouped to produce a region that is associated with a corresponding zone. In some cases, pixels of the image may be associated with detected images that include, but are not limited to sky features, facial features, or any other detectable features. In such cases, the pixels associated with a particular feature, such as sky features, can be grouped into a particular region while pixels associated with other features can be grouped into separate corresponding regions.

In general, the zone for at least one region of the plurality of regions is modified such that the at least one region is associated with a modified zone. For example, luminance values of a region of the image may be changed from luminance values included in a range of luminance values associated with an initial zone of the region to luminance values included in a different range of luminance values associated with the modified zone of the region.

The luminance modification parameters for the input image are computed for each region, at least in part, based on the zones for each respective region of the image and the modified zone of the at least one region. In some cases, shadow luminance modification parameters are generated along with separate highlight luminance modification parameters. The shadow luminance modification parameters indicate changes to luminance values of pixels in shadow regions of the image. Similarly, the highlight luminance modification parameters indicate changes to luminance values of pixels in highlight regions of the image.

Further, in various implementations, an overall shadow luminance modification parameter and an overall highlight luminance modification parameter are calculated based on the respective shadow luminance modification parameters of each region and the respective highlight luminance modification parameters of each region. For example, in various implementations, a weighted average of the highlight luminance modification parameters of the regions of the image are used to calculate the overall highlight luminance modification parameter and a weighted average of the shadow luminance modification parameters of the regions are used to calculate the overall shadow luminance modification parameter. In some cases, the weight assigned to the shadow and/or highlight modification parameters of the respective regions is based on a size of the respective regions.

The computed luminance modification parameters for the input image may then be applied to generate a non-linear function. This non-linear function may specify modifications to one or more luminance values of the image from an initial luminance value to a modified luminance value. In some situations, the non-linear function may represent an S-shaped curve, while in other cases, the non-linear function may represent an inverted S-shaped curve. A modified (e.g., exposure corrected) version of the image is then generated by applying the non-linear function to the luminance of the input image (or to the histogram stretched version of the input image). More specifically, the modified version of the input image is produced by changing respective luminance values of pixels of the image from a respective initial luminance value to a respective modified luminance value. For example, the non-linear function may specify that pixels having a luminance value of, e.g., 27 in the input image would be modified to have a value of, e.g., 42. Thus, the respective luminance values of pixels having an initial luminance value of 27 in the input image are modified to have a luminance value of 42 in the modified version of the input image.

In another example of the overall exposure correction process, in various implementations, a range of luminance values assigned to a region of the input image are modified. This modification process includes determining a zone for each respective region of a plurality of regions of the input image. The zone of each respective region indicates a specified range of luminance values associated with the respective region on a scale of luminance values. A plurality of gamma-corrected images are then generated from the input image. Each of the gamma-corrected images is generated by applying a different amount of gamma correction to the image. The amount of gamma correction applied to the image produces gamma-corrected images that emphasize different features of the image.

An edge-detection process is then applied to detect edges of particular regions of the image for each of the gamma-corrected images and for the input image. The detected edges of particular region generally indicate changes or discontinuities in the luminance of the particular region. Further, by applying the detected edges as a map, visible details of each particular region can be measured based on differences between corresponding edges detected in the different gamma-corrected images and the edges of the input image.

This process then continues by identifying one or more regions of the image that are adjacent to each particular region of the image. A relative contrast between the particular regions and the one or more of the adjacent regions is then determined based on luminance values of the particular regions and luminance values of each of the one or more adjacent regions. In various implementations, determining the relative contrast involves a comparison of the histograms of each particular region and regions adjacent to the particular region. As discussed above, the respective histogram of each region indicates the luminance values of the respective region with respect to an intensity associated with each luminance value. When determining the relative contrast, a distance between a mean luminance value of the particular region and the mean luminance value of each of the adjacent regions may be determined. In various implementations, this relative contrast is determined by identifying a minimum distance to shift the histogram of the particular region and the histogram of a respective adjacent region such that the intersection of the luminance values of the particular region and the luminance values of the adjacent region are maximized.

Further, in various implementations, the zone of any particular region is modified based, at least in part, on the visible details of the particular region and the relative contrast. In some situations, the zone of the particular region may be modified to minimize a Markov Random Field energy function that includes a term associated with the visible details of the particular region and a term associated with the relative contrast. Additionally, certain constraints may be applied when modifying zones of regions of the image. For example, modifying the zone of regions having luminance values in a specified zone may be prohibited or blocked. Thus, in some cases, regions associated with a mid-tone zone, for example, may be prohibited from being modified, while shadow and highlight zones are allowed to be modified. In another example, each region associated with a particular zone may be modified in the same way. For example, luminance values of each region associated with zone IV may be changed to luminance values associated with zone III (or other zones).

In another example of the overall exposure correction process, in various implementations, the Adaptive Exposure Corrector implements a process to produce an output image according to a non-linear function and to produce a modified output image by adding features to the output image. In various implementations, this process includes generating a non-linear function that specifies modified luminance values of one or more regions of an input image with respect to initial luminance values of the one or more regions. Further, this process modifying luminance values of shadow areas of the input image, mid-tone areas of the input image, and/or highlight areas of the input image according to the non-linear function.

In another example, in various implementations, an output image is produced based on modified luminance values of the input image. However, the appearance of the output image may have fewer details than an appearance of the input image. For example, some darker regions or underexposed regions of the input image may appear lighter in the output image. In addition, brighter regions of the input output image may appear mid-gray in the output image. As such, the mid-tone contrast of the output image may be reduced. Such issues are addressed by various implementations by generating a detail image based on differences between the input image and a filtered version of the input image. A modified output image is then produced by applying or fusing features of the detail image to the output image. The resulting modified output image then includes details (e.g., high-frequency image details) in addition to the details of the otherwise unmodified output image. In other words, this fusion process for extracted image details serves to add some features of the input image, which may have been lost (or minimized) during exposure correction, back into the modified output image.

2.3 Noise-Aware Adaptive Exposure Correction:

As mentioned above, the paragraphs of Section 2.2, 2.2.1 and 2.2.2 of this document describe various examples of techniques for performing exposure correction without consideration of image noise and potential adverse boosting of image noise during exposure correction processing of images. Section 2.3 and the subsequent sections of this document describe modifications to the exposure correction techniques of Section 2.2 in a way that further improves perceived image quality by balancing boosting of image noise with enhancement of image detail when performing real-time image corrections.

In general, the noise-aware shadow and highlight enhancement provided by various features of the Adaptive Exposure Corrector include selecting a noise level function (NLF) from each individual input image, or directly from image EXIF ISO information, and computing a noise-aware scaling function (NASF) from the NLF. Note that the NLF is one form of expressing the amount of noise as a function of intensity, where the noise is assumed Gaussian at any given intensity. Other forms exist, e.g., non-parametric noise functions as a function of intensity, and any such forms of expressing the amount of noise as a function of intensity may be adapted for use by various implementations of the Adaptive Exposure Corrector. In general, the NASF is pre-computed for each camera model or type from a combination of the NLFs computed for each camera and human selections of preferred images from sets of multiple exposure adjusted examples of images captured at each of a range of ISO's for each camera. Similarly, an optional pre-computed Color Scalar Function (CSF) is computed for each camera model or type from a combination of camera ISO features and human selections of preferred images from sets of multiple exposure adjusted examples of images captured at each of a range of camera ISO's.

Further, it is assumed, and has been verified through testing, that images with the same ISO (captured via the same or similar camera model or type) will tend to have very similar noise-level functions since they come from the same or very similar imaging sensors. As such, the ISO-based NASF sets and ISO-based CSF sets computed for any particular camera model or type is applicable for use on other instances of that particular camera model or type for use in performing real-time exposure corrections.

In general, the NASF sets and optional CSF sets are applied to adapt or modify various exposure correction functions, including but not limited to a histogram stretching function, an S-curve parameter estimation function, a detail fusion function, and an optional color saturation function. The noise- and ISO-based modifications or adaptations to these exposure correction functions produces a set of noise-aware exposure functions that are adapted to noise characteristics of particular cameras and the ISO at which particular images are captured by those cameras in combination with various human image adjustment preferences. The resulting noise aware functions are then made available to computational capabilities within or coupled to each corresponding camera model or type for real-time exposure correction operations.

The following paragraphs describe computation of the NASF and CSF, and further describe the use of these noise-aware functions to modify the exposure correction techniques described throughout this document, including in Section 2.2, 2.2.1 and 2.2.2 of this document, to provide real-time exposure correction for single images and image sequences.

2.4 Determining Noise-Level Functions (NLF):

As mentioned above, the Adaptive Exposure Corrector computes the Noise Level Function (NLF) for use in determining the aforementioned per-camera NASF sets. In general, the NLF is a function that describes how image noise sigma varies with image intensity. Typically, for dark intensity values (e.g., 0 or some other relatively low valve), the SNR (signal-to-noise ratio) would be smaller. Conversely, for bright intensity values (e.g., 255 or some other relatively high value), the SNR would be larger. In order to enable efficient real-time exposure correction of images, the Adaptive Exposure Corrector performs a calibration-based process to determine the NLF on a per-camera and per-ISO basis. The resulting set of NASF's and CSF's for each particular camera model or type are then applied according to image EXIF ISO information for real-time exposure correction of arbitrary images.

By way of example, NLF calibration for a particular camera begins by capturing burst images (or multiple sequential images using any desired technique) with the same capturing parameters for the same scene. For purposes of convenience, this same scene is typically either a known calibration target or any other static scene. For the set of the same camera parameters (e.g., shutter speed, ISO, etc., all burst images are accumulated (e.g., averaged or otherwise combined) to generate a relatively clean version of the image. Then, each of the individual burst images in combination with the corresponding clean image is treated as an image pair for noise sigma estimation.

For example, in a tested implementation, multiple images of a calibration target were obtained by mounting each camera to a tripod (or other stable mount). The camera was then used to capture the calibration target over as wide a dynamic range as possible (while avoiding too dark or saturation) or as rich colors as possible, such as a color checkboard calibration target. To reduce subtle camera shakes during this initial image capture phase, remote control of the camera was used rather than physically pressing a shutter button or the like. Further, to capture different sets of images with varied ISO, scene lighting and camera parameters such as shutter speed and ISO were varied. For purposes of consistency, the focus and white balance are typically fixed for all cases. Using such settings, the camera was used to capture from 50 to 100 burst images for 9 sets of discretized ISOs: 80, 200, 400, 500, 640, 1000, 1250, 1600, and 2000. Clearly, additional ISO settings may be used depending on the capabilities of the particular camera. Further, other ISO settings, estimated NLF sets can be interpolated from the NLFs computed from these known ISOs.

As mentioned above, the NLF is estimated from captured burst images in combination with an estimated clean image derived from the input burst images. Since the scene or calibration target is static and the camera is fixed, the simple average of such images is typically sufficient to obtain the clean image. However, as mentioned above, other techniques for generating the clean image from the burst images may be applied by the Adaptive Exposure Corrector. Following generation or estimation of the clean image, each noisy and clean image pair is converted to gray level. Since the exposure correction is based on the luminance channel, the NLF is computed in luminance.

Next, the Adaptive Exposure Corrector computes the difference between noisy image and clean image as a noise layer. The luminance of clean image, e.g., [0, 255] in the case of 8-bit images, is evenly divided into some number of bins, e.g., 16 bins. All pixels of the noise layer for each noisy image are then evenly divided into these 16 bins according to each pixel's corresponding luminance in the clean image. For each bin, a standard variance of pixel values of noise layer is then computed as the noise sigma of each bin. In addition, the percentage of pixels in each bin is viewed as noise weight. Using both noise sigma and weight, a smoothed curve is interpolated, e.g., via weighted bicubic smoothing or other interpolation method. The resulting curve is the aforementioned noise level function for a particular camera for a particular ISO.

Since the clean image is only an approximation, the direct estimation of noise sigma is biased. As such, in various implementations, this estimation is corrected. For example, the average of n images with noise sigma $\sigma$ would have sigma $\sigma/\sqrt{n}$. Thus, the standard variance of noise layer is $\sigma'$, and the exact noise sigma $$\sigma' = \sigma \times \sqrt{n} / \sqrt{n-1}.$$

2.5 Determining Noise-Aware Scaling Functions (NASF):

Given a particular ISO setting for a camera and its corresponding noise level function $f(I)$, where I is a luminance value, the Adaptive Exposure Corrector can estimate the noise-aware scaling function (NASF), also referred to herein as $s(I)$. Since it is expected to reduce boosting more for larger noise sigma values, the NASF is designed to take a form similar to an inverted form of the corresponding NLF. In other words, the NASF scalar is designed to be larger for bright intensity values, and to be smaller for dark intensity values, which is generally the opposite behavior of the corresponding NLF. Given such a formulation, the NASF is defined by Equation (7) as:

$$s(I) = \text{clamp}\left(\frac{f(I) \times \alpha(ISO) - \sigma_{min}}{\sigma_{min} - \sigma_{max}} + 1.0, 0.0, 1.0\right) \quad \text{Equation (7)}$$

where $\sigma_{min}$=2.0 and $\sigma_{max}$=6.0 are default values that have been observed to provide acceptable results. However, these default values may be adjusted if desired.

A ratio referred to herein as the $\alpha(ISO)$ ratio (or "alpha function") controls perceptual extent for different noise and lighting conditions. In other words, the $\alpha(ISO)$ ratio is a function of human selections of preferred images from sets including multiple exposure adjusted versions of that image, as discussed above. In general, there are at least two options for setting or determining the $\alpha(ISO)$ ratio. For example, in the case that the user expects less boosting for high ISO images and more boosting for low ISO images, users may be more concerned about noise amplification than image detail boosting. As such, in this case, the $\alpha(ISO)$ ratio can be set to $\alpha(ISO)$=1.0. However, in cases where users expect more boosting for low light images (usually high ISO for automatic exposure metering) and less boosting for low ISO images, users tend to care about detail boosting for low light conditions, and may ignore noise issues, especially for small size images. In this case, the $\alpha(ISO)$ ration is given by Equation 8:

$$\alpha(ISO) = a_1 \times \left(1.0 - \frac{1.0}{a_2 + \exp(a_3 * (\log_2(ISO) - \log_2(\tau)))}\right) \quad \text{Equation (8)}$$

where $a_1$=2.0, $a_2$=1.15, $a_3$=−1.5, $\tau$=350.0 are default values that are a function of human selections of preferred images from sets including multiple exposure adjusted versions of that image for a particular ISO, as discussed above. Note that these default values may change depending upon the particular expert or group of experts or users making the selection of preferred images. In general, the second option (e.g., an $\alpha(ISO)$ ratio such as that provided by Equation (8)), has been observed to result in perceptually satisfactory exposure corrections, especially for phone-based cameras. As such, use of the α(ISO) ratio of Equation (8) will be assumed for the following discussion, with the understanding that other α(ISO) ratio formulations may be used by the Adaptive Exposure Corrector.

2.6 NASF for Real-Time Shadow and Highlight Enhancement:

As mentioned above, the camera and ISO-based NASF sets are applied by the Adaptive Exposure Corrector to adapt various exposure correction functions to consider both noise and human preferences with respect to shadow and highlight enhancements. Operational details for various implementations of this process are described in the following paragraphs.

2.6.1 Noise-Aware Histogram Stretching:

The histogram stretching based exposure correction described in Section 2.2 of this document first linearly stretches the image histogram to the maximum range, e.g., [0, 255] for 8-bit images, according to the minimum and maximum intensity values in an arbitrary image. Consequently, this linear boosting process boosts intensity values, while also amplifying noise. To reduce this amplification of noise during the histogram stretching process, in various implementations, the Adaptive Exposure Corrector applies the NASF sets for each particular camera to modify the linear histogram stretching of Section 2.2 to provide a noise-aware non-linear histogram stretching process, as follows:

$$I' = \left(\frac{I - I_{min}}{I_{max} - I_{min}} - I\right) \times s(I) + I \qquad \text{Equation (9)}$$

where $I_{max}, I_{min}$ are respectively maximum and minimum values of intensities, and as mentioned above, s(I) refers to the NASF for the particular ISO being considered. Further I' is clamped to a range of [0, 255], assuming an 8-bit space.

2.6.2 Noise-Aware S-Curve Modification:

The S-Curve based exposure correction described in Section 2.2 of this document automatically estimates two parameters of S-shaped tone mapping curve: shadow and highlight amounts, according to local region exposure analysis. In contrast, in the noise aware case, the Adaptive Exposure Corrector applies NASF only to shadow boosting since highlight adjustments usually go down in intensity and there tends to be relatively small noise level in highlight tones. However, NASF may also be applied to highlight adjustments, if desired. In the shadow only boosting case, the original S-curve function described in Section 2.2 is modified by considering NASF as follows:

$$f'(I) = I + \phi_s \times f_\Delta(I) \times s(I) - \phi_h \times f_\Delta(255 - I) \qquad \text{Equation (10)}$$

where I and f'(I) are the input and output intensities, and $f_\Delta(I)$ is the incremental function that is empirically defined as:

$$f_\Delta(I) = \kappa_1 I \times \exp\left(-\kappa_2 \times \left(\frac{I}{255}\right)^{\kappa_3}\right) \qquad \text{Equation (11)}$$

where $\kappa_1 = 5, \kappa_2 = 14, \kappa_3 = 1.6$ are default values that have been observed to provide acceptable results. However, these default values may be adjusted.

2.6.3 Noise-Aware Detail Fusion:

The S detail layer of fusion based exposure correction described in Section 2.2 of this document attempts to preserve detail contrast by first extracting high frequency image details from the original input image and then fusing the detail layer with the tone mapped result of the S-curve based processing. However, the extracted detail layer also typically involves noise, which tends to be boosted or amplified in the fusion step. Therefore, to address the issue of noise boosting in the fusion step, the Adaptive Exposure Corrector applies the ISO-based NASF to the extracted details as follows:

$$\Delta I' = \Delta I \times (s(I) * 0.5 + 0.5) \qquad \text{Equation (12)}$$

where the details image $\Delta I = I - I_F$, as discussed previously with respect to Equation (6), and $I_F$ is the filtered image by applying one or more low-pass filters (e.g., a Gaussian filter) to image I.

Then, the final image Î' is a weighted linear combination:

$$\hat{I}' = f'(I) + [2 \times f'(I) \times (255 - f'(I))] \times \Delta I' \qquad \text{Equation (13)}$$

where f'(I) is the output of S-curve mapped result and the image is in an 8-bit space.

2.7 Noise-Aware Color Saturation Compensation:

Since the above-described tone mapping and detail fusion only occur at luminance channel, the chrominance channels would compensate the loss of color saturation correspondingly. However, in contrast to the use of NASF for histogram stretching, S-curve parameter estimation, and detail fusion, the Adaptive Exposure Corrector computes an additional color scalar instead of NASF for color saturation compensation. This color scalar is defined as the function of ISO value, where:

$$r = 1.0 - \beta \times \left(1.0 - \frac{\log(ISO_{max}) - \log(ISO)}{\log(ISO_{max}) - \log(ISO_{min})}\right) \qquad \text{Equation (14)}$$

where $ISO_{max}$ and $ISO_{min}$ are, respectively, the maximum and minimum ISO value of camera, $\beta = 0.25$ by default based on human image selection preferences. More specifically, $\beta$ is a function of human selections of a preferred image from sets including multiple color saturation adjusted versions of that image, as discussed above. Further, ISO is the current ISO value of captured image, and is directly read from its EXIF information.

Then, the original saturation compensation scaling function c(I) described in Section 2.2 of this document is modified by considering the scalar r, such that:

$$c(I) = 0.5 \times (1.0 + (\gamma \times f_\Delta(I) + f_\Delta(255 - I)) \times r) + 0.5 \qquad \text{Equation (15)}$$

where $f_\Delta(I)$ and $f_\Delta(255 - I)$ are respectively the increments of shadow and highlight through S-curve function, and $\gamma = 1.2$ by default based on human image selection preferences. More specifically, $\gamma$ is a function of human selections of a preferred image from sets including multiple color saturation adjusted versions of that image, as discussed above.

The modified version of the scaling function c(I) is then applied to the difference between RGB channel and luminance when updating RGB values, as illustrated by Equation (16), where:

$$I'_{\{Red, Green, Blue\}} = (I_{\{Red, Green, Blue\}} - I) \times C(I) + I' \qquad \text{Equation (16)}$$

where I is original luminance channel, and I' is updated luminance channel resulting from by S-curve mapping and details fusion. The above function of RGB channels illustrate how to efficiently update Red, Blue, Green color values from luminance intensity change without the need of color conversation. Similar adaptations can be performed for other color spaces.

2.8 Data-Driven Parameter Estimation:

The values parameters in the values equations above are typically hand selected empirically. In various implementations, rather than select such parameters empirically, the Adaptive Exposure Corrector applies a large before-and-after image dataset, which allows parameters to be automatically estimated (e.g., using regression analysis).

Figure 3:
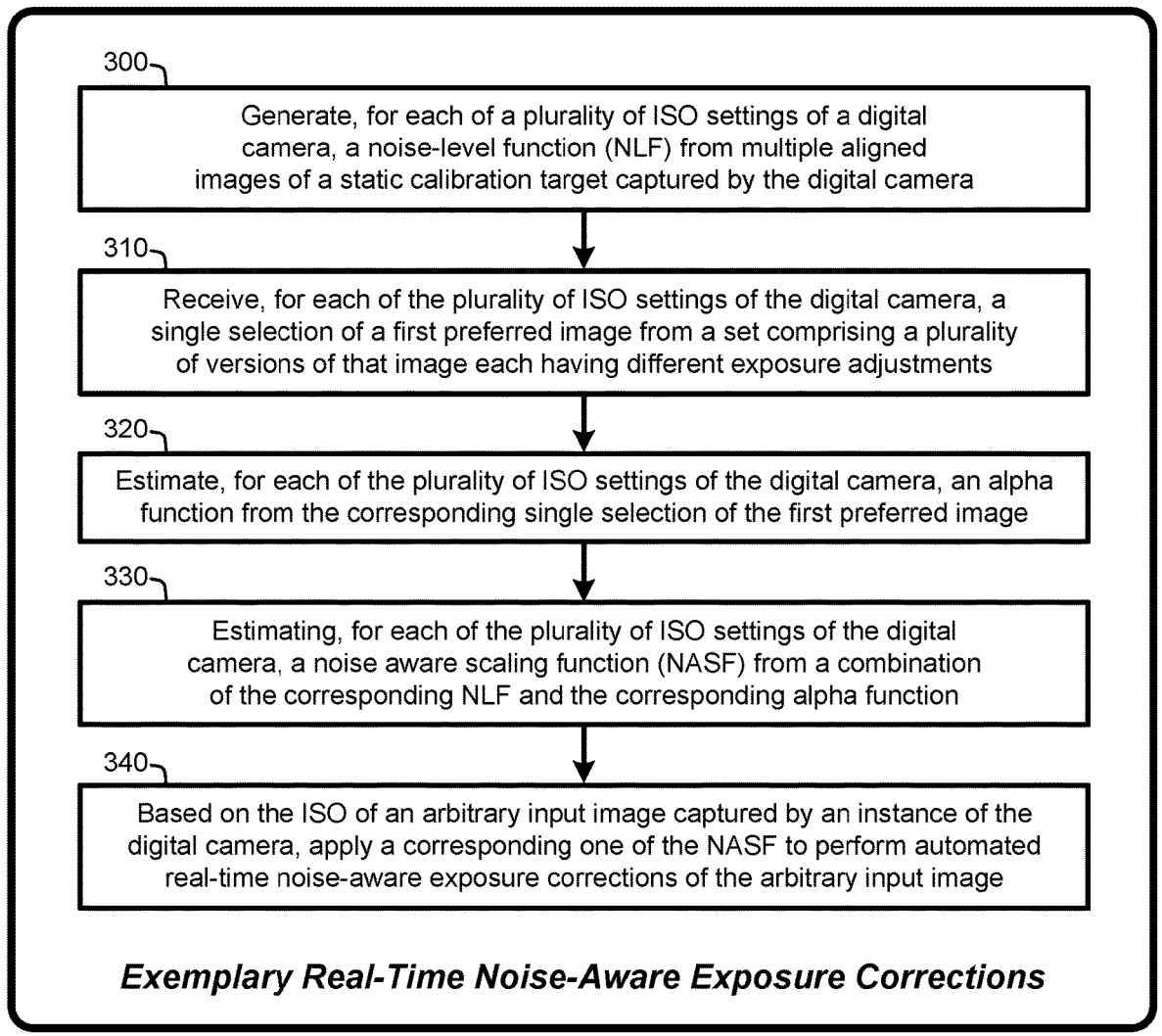
FIG. 3 illustrates a general system flow diagram that illustrates exemplary techniques for effecting various implementations of the Adaptive Exposure Corrector, as described herein.
Figure 4:
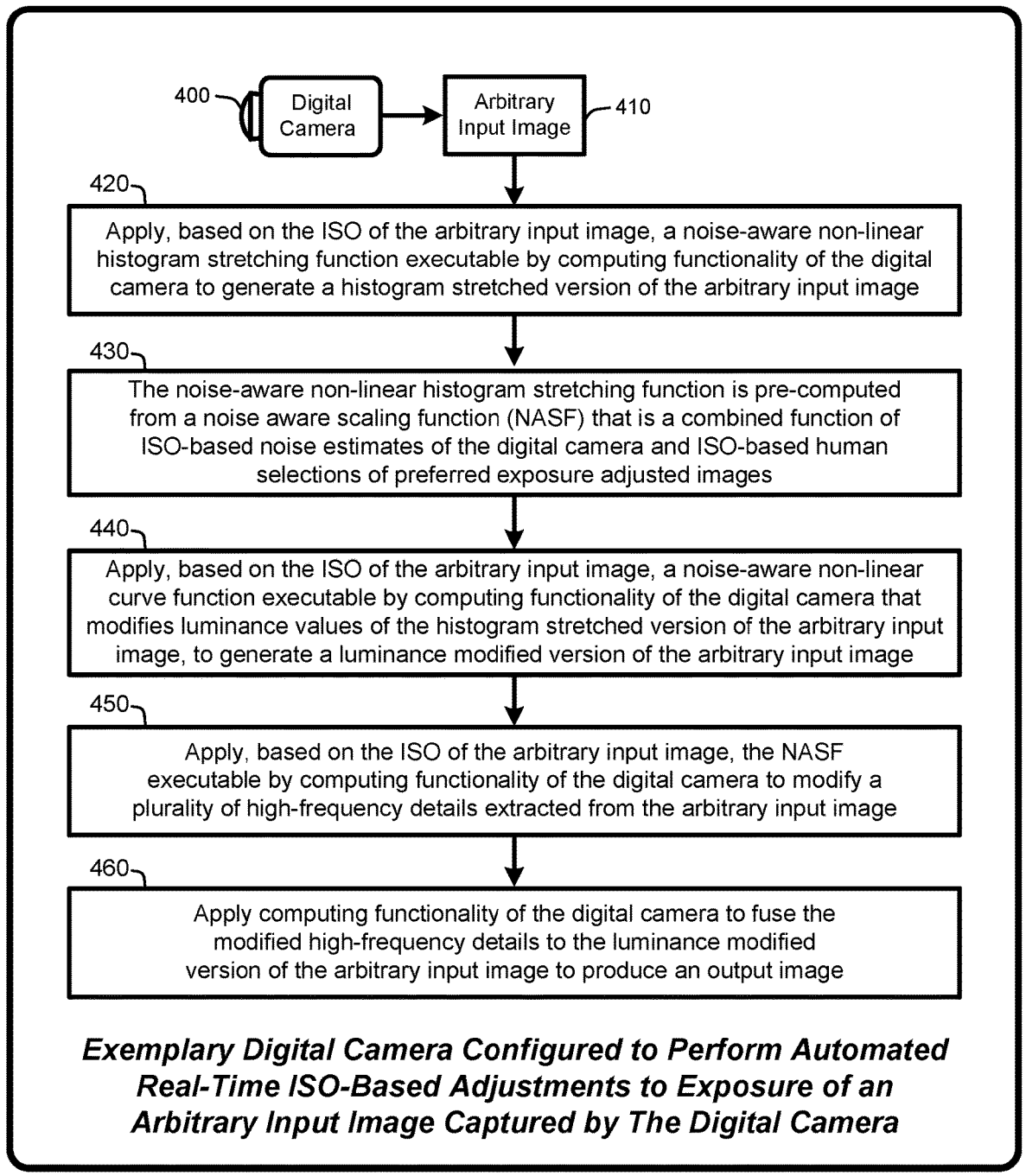
FIG. 4 illustrates a general system flow diagram that illustrates exemplary techniques for effecting various implementations of the Adaptive Exposure Corrector, as described herein.
Figure 5:
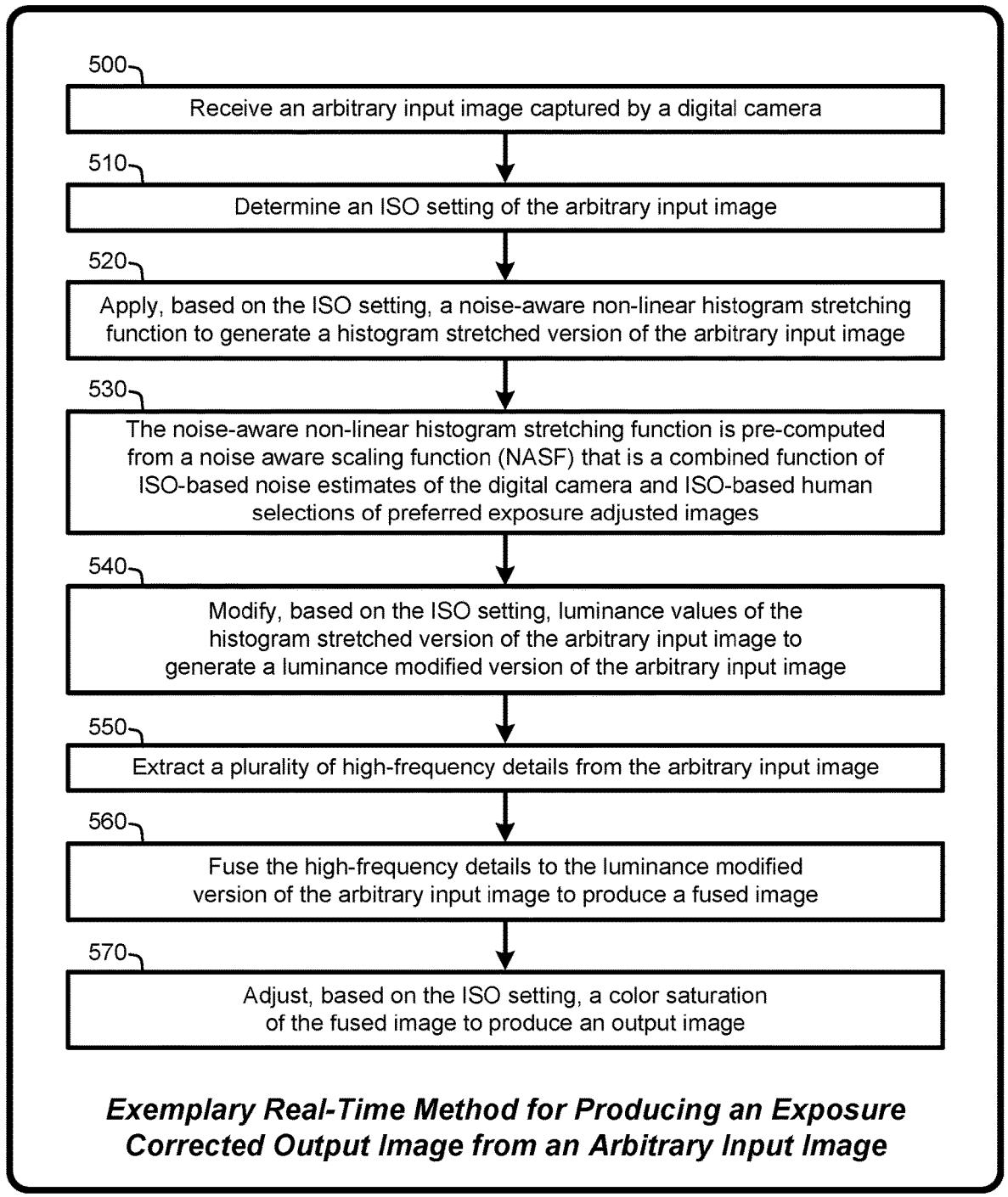
FIG. 5 illustrates a general system flow diagram that illustrates exemplary techniques for effecting various implementations of the Adaptive Exposure Corrector, as described herein.

3.0 Operational Summary of the Adaptive Exposure Corrector:

The processes described above with respect to FIG. 1 and FIG. 2, and in further view of the detailed description provided above in Sections 1 and 2, are illustrated by the general operational flow diagrams of FIG. 3 through FIG. 5. In particular, FIG. 3 through FIG. 5 provide exemplary operational flow diagrams that summarizes the operation of some of the various implementations of the Adaptive Exposure Corrector. FIG. 3 through FIG. 5 are not intended to provide an exhaustive representation of all of the various implementations of the Adaptive Exposure Corrector described herein, and the implementations represented in these figures are provided only for purposes of explanation.

Further, any boxes and interconnections between boxes that may be represented by broken or dashed lines in FIG. 3 through FIG. 5 represent optional or alternate implementations of the Adaptive Exposure Corrector described herein, and any or all of these optional or alternate implementations, as described below, may be used in combination with other alternate implementations that are described throughout this document.

In general, as illustrated by FIG. 3, in various implementations, the Adaptive Exposure Corrector begins operation by generating 300, for each of a plurality of ISO settings of a digital camera, a noise-level function (NLF) from multiple aligned images of a static calibration target captured by the digital camera. Next, the Adaptive Exposure Corrector receives 310, for each of the plurality of ISO settings of the digital camera, a single selection of a first preferred image from a set comprising a plurality of versions of that image each having different exposure adjustments. The Adaptive Exposure Corrector then estimates 320, for each of the plurality of ISO settings of the digital camera, an alpha function from the corresponding single selection of the first preferred image. The Adaptive Exposure Corrector then estimates 330, for each of the plurality of ISO settings of the digital camera, a noise aware scaling function (NASF) from a combination of the corresponding NLF and the corresponding alpha function. Finally, in various implementations, based on the ISO of an arbitrary input image captured by an instance of the digital camera, the Adaptive Exposure Corrector applies 340 a corresponding one of the NASF to perform automated real-time noise-aware exposure corrections of the arbitrary input image.

Similarly, as illustrated by FIG. 4, in various implementations, the Adaptive Exposure Corrector is implemented as a digital camera 400 configured to perform automated real-time ISO-based adjustments to exposure of an arbitrary input image 410 captured by the digital camera. In various implementations, these real-time adjusts begin by applying 420, based on the ISO of the arbitrary input image, a noise-aware non-linear histogram stretching function executable by computing functionality of the digital camera to generate a histogram stretched version of the arbitrary input image. As described herein, this noise-aware non-linear histogram stretching function is pre-computed 430 from a noise aware scaling function (NASF) that is a combined function of ISO-based noise estimates of the digital camera and ISO-based human selections of preferred exposure adjusted images. The real-time adjustment continues by applying 440, based on the ISO of the arbitrary input image, a noise-aware non-linear curve function executable by computing functionality of the digital camera that modifies luminance values of the histogram stretched version of the arbitrary input image, to generate a luminance modified version of the arbitrary input image. Next, the real-time adjustment process continues by applying 450, based on the ISO of the arbitrary input image, the NASF executable by computing functionality of the digital camera to modify a plurality of high-frequency details extracted from the arbitrary input image. Finally, the real-time adjustment continues by applying 460 computing functionality of the digital camera to fuse the modified high-frequency details to the luminance modified version of the arbitrary input image to produce an output image.

Similarly, as illustrated by FIG. 5, in various implementations, the Adaptive Exposure Corrector executes a real-time method for producing an output image from an arbitrary input image. This real-time method begins operation by receiving 500 an arbitrary input image captured by a digital camera. Next, this real-time method continues by determining 510 an ISO setting of the arbitrary input image. This real-time method continues by applying 520, based on the ISO setting, a noise-aware non-linear histogram stretching function to generate a histogram stretched version of the arbitrary input image. As discussed herein, this noise-aware non-linear histogram stretching function is pre-computed 530 from a noise aware scaling function (NASF) that is a combined function of ISO-based noise estimates of the digital camera and ISO-based human selections of preferred exposure adjusted images. The real-time method continues by modifying 540, based on the ISO setting, luminance values of the histogram stretched version of the arbitrary input image to generate a luminance modified version of the arbitrary input image. Next, this real-time method continues by extracting 550 a plurality of high-frequency details from the arbitrary input image. This real-time method then fuses 560 the high-frequency details to the luminance modified version of the arbitrary input image to produce a fused image. Finally, this real-time method adjusts 570, based on the ISO setting, a color saturation of the fused image to produce an output image.

4.0 Exemplary Implementations of the Adaptive Exposure Corrector:

The following paragraphs summarize various examples of implementations that may be claimed in the present document. The implementations summarized below are not intended to limit the subject matter that may be claimed in view of the detailed description of the Adaptive Exposure Corrector. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, an Adaptive Exposure Corrector is implemented by means, processes or techniques for performing fully automated real-time exposure correction of individual images as they are captured by a still or video camera. As such, the Adaptive Exposure Corrector enhances and improves user experience enabling users to capture images that are automatically improved without requiring user intervention or input.

As a first example, in various implementations, automated exposure correction is implemented via means, processes or techniques for performing automated real-time noise-aware exposure corrections of an arbitrary input image. This process begins operation by generating, for each of a plurality of ISO settings of a digital camera, a noise-level function (NLF) from multiple aligned images of a static calibration target captured by the digital camera. Next, the Adaptive Exposure Corrector receives, for each of the plurality of ISO settings of the digital camera, a single selection of a first preferred image from a set comprising a plurality of versions of that image each having different exposure adjustments. The Adaptive Exposure Corrector then estimates, for each of the plurality of ISO settings of the digital camera, an alpha function from the corresponding single selection of the first preferred image. The Adaptive Exposure Corrector then estimates, for each of the plurality of ISO settings of the digital camera, a noise aware scaling function (NASF) from a combination of the corresponding NLF and the corresponding alpha function. Finally, in various implementations, based on the ISO of an arbitrary input image captured by an instance of the digital camera, the Adaptive Exposure Corrector applies a corresponding one of the NASF to perform automated real-time noise-aware exposure corrections of the arbitrary input image.

As a second example, in various implementations, the first example is further modified via means, processes or techniques further comprising receiving, for each of the plurality of ISO settings of the digital camera, a single selection of a second preferred image from a set comprising a plurality of versions of the image each having different color saturation adjustments, and estimating, for each of the plurality of ISO settings of the digital camera, a color scaling function (CSF) from the corresponding single selection of the second preferred image.

As a third example, in various implementations, the first example is further modified via means, processes or techniques further comprising applying, based on the ISO of the arbitrary input image, a corresponding one of the CSF to perform automated real-time noise-aware color saturation adjustments of the arbitrary input image.

As a fourth example, in various implementations, any of the first example, the second example and the third example are further modified via means, processes or techniques further comprising for each of the plurality of ISO settings of the digital camera, applying a corresponding one of the NASF to generate a noise-aware non-linear histogram stretching function by applying the corresponding NASF to a linear stretching function and clamping the resulting non-linear stretching function to a minimum and maximum intensity range.

As a fifth example, in various implementations, the fourth example is further modified via means, processes or techniques further comprising applying, based on the ISO of the arbitrary input image, a corresponding one of the noise-aware non-linear histogram stretching functions to perform automated real-time histogram stretching of the arbitrary input image.

As a sixth example, in various implementations, any of the first example, the second example, the third example, the fourth example and the fifth example, are further modified via means, processes or techniques further comprising, for each of the plurality of ISO settings of the digital camera, applying a corresponding one of the NASF to estimate a noise-aware non-linear curve that specifies modified luminance values of one or more regions of the arbitrary input image with respect to initial luminance values of the one or more regions.

As a seventh example, in various implementations, any of the first example, the second example, the third example, the fourth example, the fifth example and the sixth example, are further modified via means, processes or techniques further comprising, extracting a plurality of high-frequency details from the arbitrary input image, and applying, based on the ISO of the arbitrary input image, a corresponding one of NASF to modify the extracted high-frequency details.

As an eighth example, in various implementations, the seventh example is further modified via means, processes or techniques further comprising fusing the modified high-frequency details to an exposure corrected version of the arbitrary input image.

As a ninth example, in various implementations, automated exposure correction is implemented via means, processes or techniques for performing automated real-time noise-aware exposure corrections of an arbitrary input image via computing functionality of a digital camera. This system begins operation via a digital camera configured to perform automated real-time ISO-based adjustments to exposure of an arbitrary input image captured by the digital camera. In various implementations, these real-time adjustments begin by applying, based on the ISO of the arbitrary input image, a noise-aware non-linear histogram stretching function executable by computing functionality of the digital camera to generate a histogram stretched version of the arbitrary input image. Further, the noise-aware non-linear histogram stretching function is pre-computed from a noise aware scaling function (NASF) that is a combined function of ISO-based noise estimates of the digital camera and ISO-based human selections of preferred exposure adjusted images. Next, these real-time adjustments continue by applying, based on the ISO of the arbitrary input image, a noise-aware non-linear curve function executable by computing functionality of the digital camera that modifies luminance values of the histogram stretched version of the arbitrary input image, to generate a luminance modified version of the arbitrary input image. The real-time adjustments continue by applying, based on the ISO of the arbitrary input image, the NASF executable by computing functionality of the digital camera to modify a plurality of high-frequency details extracted from the arbitrary input image. Finally, these real-time adjustments continue by applying computing functionality of the digital camera to fuse the modified high-frequency details to the luminance modified version of the arbitrary input image to produce an output image. In addition, in various implementations, this ninth example may incorporate some or all of the features of the first example, the second example, the third example, the fourth example, the fifth example, the sixth example, the seventh example, the eighth example, and the tenth example.

As a tenth example, in various implementations, automated exposure correction is implemented via means, processes or techniques for performing automated real-time noise-aware exposure corrections of an arbitrary input image via computing functionality of a digital camera. This method begins operation by receiving an arbitrary input image captured by a digital camera. Next, this real-time method continues by determining an ISO setting of the arbitrary input image. This real time method continues by applying, based on the ISO setting, a noise-aware non-linear histogram stretching function to generate a histogram stretched version of the arbitrary input image. As discussed herein, this noise-aware non-linear histogram stretching function is pre-computed from a noise aware scaling function (NASF) that is a combined function of ISO-based noise estimates of the digital camera and ISO-based human selections of preferred exposure adjusted images. The real-time method continues by modifying, based on the ISO setting, luminance values of the histogram stretched version of the arbitrary input image to generate a luminance modified version of the arbitrary input image. Next, this real-time method continues by extracting a plurality of high-frequency details from the arbitrary input image. This real-time method then fuses the high-frequency details to the luminance modified version of the arbitrary input image to produce a fused image. Finally, this real-time method adjusts, based on the ISO setting, a color saturation of the fused image to produce an output image. In addition, in various implementations, this tenth example may incorporate some or all of the features of the first example, the second example, the third example, the fourth example, the fifth example, the sixth example, the seventh example, the eighth example, and the ninth example.

Figure 6:
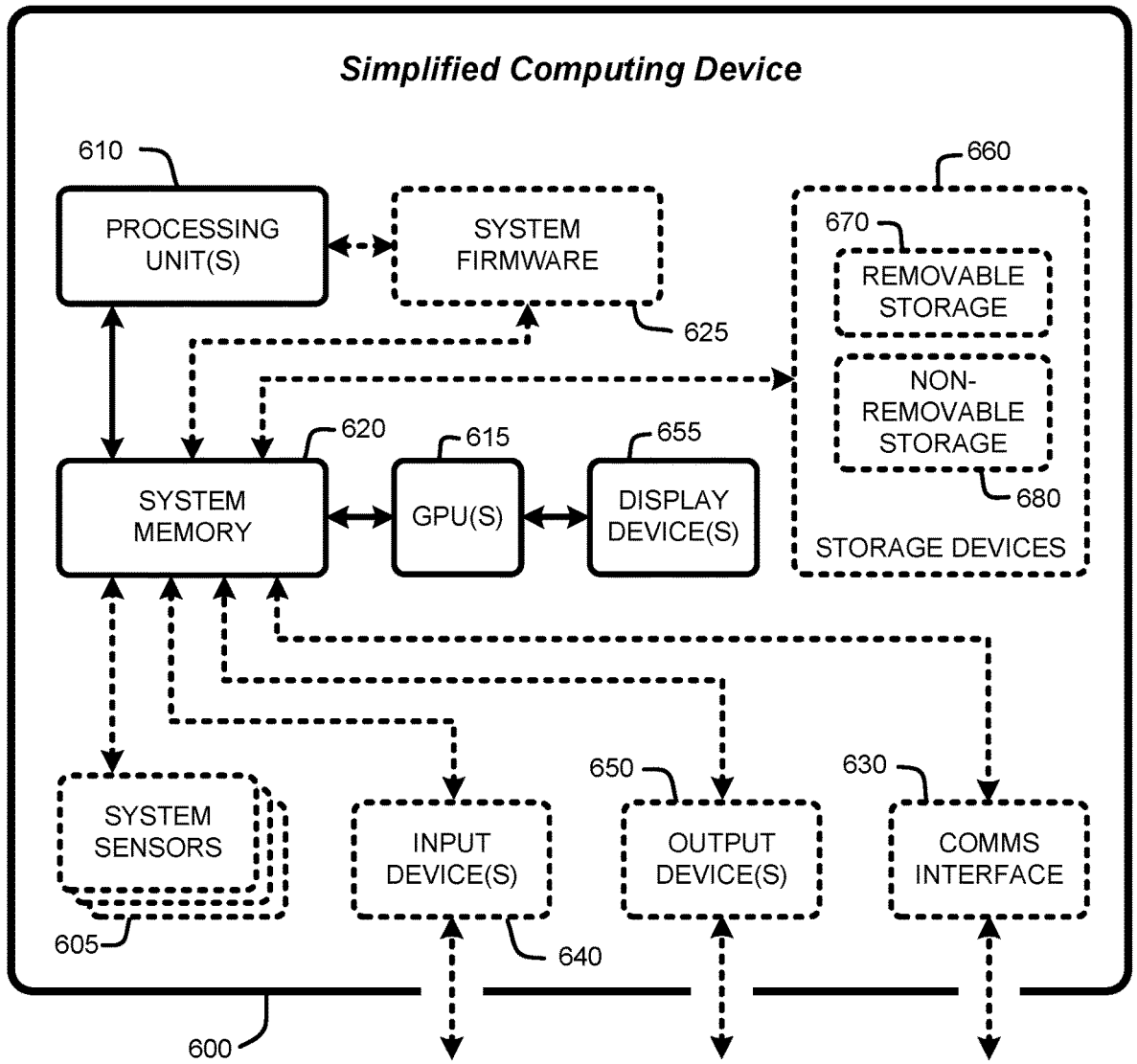
FIG. 6 is a general system diagram depicting a simplified general-purpose computing device having simplified computing and I/O capabilities for use in effecting various implementations of the Adaptive Exposure Corrector, as described herein.

5.0 Exemplary Operating Environments:

The Adaptive Exposure Corrector implementations described herein are operational within numerous types of general purpose or special purpose computing system environments or configurations. FIG. 6 illustrates a simplified example of a general-purpose computer system on which various implementations and elements of the Adaptive Exposure Corrector, as described herein, may be implemented. Any boxes that are represented by broken or dashed lines in the simplified computing device 600 shown in FIG. 6 represent alternate implementations of the simplified computing device. As described below, any or all of these alternate implementations may be used in combination with other alternate implementations that are described throughout this document.

The simplified computing device 600 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Adaptive Exposure Corrector implementations described herein, the device should have a sufficient computational capability and system memory to enable basic computational operations. In particular, the computational capability of the simplified computing device 600 shown in FIG. 6 is generally illustrated by one or more processing unit(s) 610, and may also include one or more graphics processing units (GPUs) 615, either or both in communication with system memory 620. The processing unit(s) 610 of the simplified computing device 600 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 600 may also include other components, such as, for example, a communications interface 630. The simplified computing device 600 may also include one or more conventional computer input devices 640 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 600 and with any other component or feature of the Adaptive Exposure Corrector, including input, output, control, feedback, and response to one or more users or other devices or systems associated with the Adaptive Exposure Corrector, are enabled by a variety of Natural User Interface (NUI) scenarios. The NUI techniques and scenarios enabled by the Adaptive Exposure Corrector include, but are not limited to, interface technologies that allow one or more users user to interact with the Adaptive Exposure Corrector in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 640 or system sensors 605. Such NUI implementations are also enabled by the use of various techniques including, but not limited to, information derived from system sensors 605 or other input devices 640 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Adaptive Exposure Corrector.

However, the aforementioned exemplary NUI scenarios may be further augmented by combining the use of artificial constraints or additional signals with any combination of NUI inputs. Such artificial constraints or additional signals may be imposed or generated by input devices 640 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Adaptive Exposure Corrector.

The simplified computing device 600 may also include other optional components such as one or more conventional computer output devices 650 (e.g., display device(s) 655, audio output devices, video output devices, devices for transmitting wired or wireless data transmissions, and the like). Typical communications interfaces 630, input devices 640, output devices 650, and storage devices 660 for general-purpose computers are well known to those skilled in the art, and will not be described in detail herein.

The simplified computing device 600 shown in FIG. 6 may also include a variety of computer-readable media. Computer-readable media can be any available media that can be accessed by the computing device 600 via storage devices 660, and include both volatile and nonvolatile media that is either removable 670 and/or non-removable 680, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Adaptive Exposure Corrector implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 625, hardware, or any combination thereof to control a computer to implement the disclosed subject matter. The term "article of manufacture" as used herein is intended to encompass a computer program accessible from any computer-readable device, or media.

The Adaptive Exposure Corrector implementations described herein may be further described in the general context of computer-executable instructions, such as program modules, being executed by a computing device. Generally, program modules include routines, programs, objects, components, data structures, and the like, that perform particular tasks or implement particular abstract data types. The Adaptive Exposure Corrector implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the Adaptive Exposure Corrector has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the Adaptive Exposure Corrector. It is intended that the scope of the Adaptive Exposure Corrector be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Adaptive Exposure Corrector described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A computer-implemented process comprising applying a general-purpose computing device to perform process actions for:
    generating, for each of a plurality of ISO settings of a digital camera, a noise-level function (NLF) from multiple aligned images of a static calibration target captured by the digital camera;
    receiving, for each of the plurality of ISO settings of the digital camera, a single selection of a first preferred image from a set comprising a plurality of versions of that image each having different exposure adjustments;
    estimating, for each of the plurality of ISO settings of the digital camera, an alpha function from the corresponding single selection of the first preferred image;
    estimating, for each of the plurality of ISO settings of the digital camera, a noise aware scaling function (NASF) from a combination of the corresponding NLF and the corresponding alpha function; and
    based on the ISO of an arbitrary input image captured by an instance of the digital camera, applying a corresponding one of the NASF to perform automated real-time noise-aware exposure corrections of the arbitrary input image.

2. The computer-implemented process of claim 1, further comprising:
    receiving, for each of the plurality of ISO settings of the digital camera, a single selection of a second preferred image from a set comprising a plurality of versions of the image each having different color saturation adjustments; and
    estimating, for each of the plurality of ISO settings of the digital camera, a color scaling function (CSF) from the corresponding single selection of the second preferred image.

3. The computer-implemented process of claim 2 further comprising applying, based on the ISO of the arbitrary input image, a corresponding one of the CSF to perform automated real-time noise-aware color saturation adjustments of the arbitrary input image.

4. The computer-implemented process of claim 1 further comprising, for each of the plurality of ISO settings of the digital camera, applying a corresponding one of the NASF to generate a noise-aware non-linear histogram stretching function by applying the corresponding NASF to a linear stretching function and clamping the resulting non-linear stretching function to a minimum and maximum intensity range.

5. The computer-implemented process of claim 4 further comprising applying, based on the ISO of the arbitrary input image, a corresponding one of the noise-aware non-linear histogram stretching functions to perform automated real-time histogram stretching of the arbitrary input image.

6. The computer-implemented process of claim 1 further comprising, for each of the plurality of ISO settings of the digital camera, applying a corresponding one of the NASF to estimate a noise-aware non-linear curve that specifies modified luminance values of one or more regions of the arbitrary input image with respect to initial luminance values of the one or more regions.

7. The computer-implemented process of claim 1 further comprising:
    extracting a plurality of high-frequency details from the arbitrary input image; and
    applying, based on the ISO of the arbitrary input image, a corresponding one of the NASF to modify the extracted high-frequency details.

8. The computer-implemented process of claim 7 further comprising fusing the modified high-frequency details to an exposure corrected version of the arbitrary input image.

9. The computer-implemented process of claim 1 further comprising generating a plurality of estimated ISO-based NLFs for the digital camera by interpolating each of the estimated ISO-based NLFs from one or more of the NLFs generated for each of the plurality of ISO settings of the digital camera from the multiple aligned images of the static calibration target.

10. A system, comprising:
    a digital camera configured to perform automated real-time ISO-based adjustments to exposure of an arbitrary input image captured by the digital camera;
    the real-time adjustments further comprising:
    applying, based on the ISO of the arbitrary input image, a noise-aware non-linear histogram stretching function executable by computing functionality of the digital camera to generate a histogram stretched version of the arbitrary input image;
    the noise-aware non-linear histogram stretching function being pre-computed from a noise aware scaling function (NASF) that is a combined function of ISO-based noise estimates of the digital camera and ISO-based human selections of preferred exposure adjusted images;
    applying, based on the ISO of the arbitrary input image, a noise-aware non-linear curve function executable by computing functionality of the digital camera that modifies luminance values of the histogram stretched version of the arbitrary input image, to generate a luminance modified version of the arbitrary input image;

applying, based on the ISO of the arbitrary input image, the NASF executable by computing functionality of the digital camera to modify a plurality of high-frequency details extracted from the arbitrary input image; and applying computing functionality of the digital camera to fuse the modified high-frequency details to the luminance modified version of the arbitrary input image to produce an output image.

11. The system of claim 10, further comprising:

applying, based on the ISO of the arbitrary input image, a noise-aware color scaling function (CSF) to perform automated real-time noise-aware color saturation adjustments of the arbitrary input image; and the noise-aware CSF being pre-computed from human selections of a preferred image from a set comprising a plurality of versions of that image each having different color saturation adjustments.

12. The system of claim 10 further comprising clamping the noise-aware non-linear histogram stretching function to a minimum and maximum intensity range.

13. The system of claim 10 further comprising computing, for each of a plurality of particular ISO settings of the camera, a corresponding one of the ISO-based noise estimates by computing a noise-level function (NLF) from multiple aligned images of a static scene captured by the digital camera at the particular ISO setting.

14. The system of claim 13 further comprising generating a plurality of estimated ISO-based NLFs for the digital camera by interpolating each of the estimated ISO-based NLFs from one or more of the NLFs generated for each of the plurality of ISO settings of the digital camera from the multiple aligned images of the static scene.

15. A computer storage device having computer executable instructions stored therein, said instructions causing a computing device to execute a real-time method for producing an output image from an arbitrary input image, comprising:

receiving an arbitrary input image captured by a digital camera;

determining an ISO setting of the arbitrary input image;

applying, based on the ISO setting, a noise-aware non-linear histogram stretching function to generate a histogram stretched version of the arbitrary input image;

the noise-aware non-linear histogram stretching function being pre-computed from a noise aware scaling function (NASF) that is a combined function of ISO-based noise estimates of the digital camera and ISO-based human selections of preferred exposure adjusted images;

modifying, based on the ISO setting, luminance values of the histogram stretched version of the arbitrary input image to generate a luminance modified version of the arbitrary input image; and extracting a plurality of high-frequency details from the arbitrary input image;

fusing the high-frequency details to the luminance modified version of the arbitrary input image to produce a fused image.

16. The computer storage device of claim 15 further comprising adjusting, based on the ISO setting, a color saturation of the fused image to produce an output image.

17. The computer storage device of claim 15 further comprising adjusting the color saturation by applying an ISO-based noise-aware color scaling function (CSF) to the fused image, the CSF being pre-computed based on human selections of a preferred image from a set comprising a plurality of versions of that selected image each having different color saturation adjustments.

18. The computer storage device of claim 15 further comprising clamping the noise-aware non-linear histogram stretching function to a minimum and maximum intensity range.

19. The computer storage device of claim 15 further comprising computing, for each of a plurality of particular ISO settings of the digital camera, a corresponding one of the ISO-based noise estimates from multiple aligned images of a static scene captured by the digital camera at the particular ISO setting.

20. The computer storage device of claim 19 further comprising generating a plurality of interpolated ISO-based noise estimates for the digital camera by interpolating each of the interpolated ISO-based noise estimates from one or more of the ISO-based noise estimates computed from multiple aligned images of a static scene.

* * * * *